US010586283B2

(12) United States Patent
Downer et al.

(10) Patent No.: US 10,586,283 B2
(45) Date of Patent: Mar. 10, 2020

(54) ELEKTRON PULSE METHODS, APPARATUSES AND MEDIA

(71) Applicant: Thomson Reuters Global Resources Unlimited Company, Baar (CH)

(72) Inventors: Christopher Downer, London (GB); Robert Bonaguro, Naperville, IL (US); Mark Ryall, Loughton (GB)

(73) Assignee: Refinitiv US Organization LLC, New York, NY (US)

( * ) Notice: Subject to any disclaimer, the term of this patent is extended or adjusted under 35 U.S.C. 154(b) by 406 days.

(21) Appl. No.: 14/727,055

(22) Filed: Jun. 1, 2015

(65) Prior Publication Data

US 2016/0358251 A1    Dec. 8, 2016

(51) Int. Cl.
*H04L 12/26* (2006.01)
*G06Q 40/04* (2012.01)
*H04L 29/08* (2006.01)
*H04L 12/58* (2006.01)

(52) U.S. Cl.
CPC .......... *G06Q 40/04* (2013.01); *H04L 43/0811* (2013.01); *H04L 43/0817* (2013.01); *H04L 51/30* (2013.01); *H04L 67/16* (2013.01)

(58) Field of Classification Search
CPC .... G06Q 40/04; G06Q 40/06; H04L 43/0817; H04L 43/0823; H04L 51/30; H04L 67/16; G06F 11/0736; G06F 11/30; G06F 11/3003; G06F 11/3006; G06F 11/3017; G06F 11/302; G06F 11/3051; G06F 11/3055; G06F 11/3065

See application file for complete search history.

(56) References Cited

U.S. PATENT DOCUMENTS

| 5,790,789 | A | * | 8/1998 | Suarez | ............... | G06F 9/5055 709/202 |
| 6,006,206 | A | * | 12/1999 | Smith | ............... | G06F 19/324 705/35 |
| 7,680,718 | B2 | * | 3/2010 | Brandes | ............... | G06Q 10/04 705/36 R |
| 2005/0137961 | A1 | * | 6/2005 | Brann | ............... | G06Q 40/04 705/37 |
| 2005/0262397 | A1 | * | 11/2005 | Fitzgerald | ............ | H04L 41/0631 714/31 |

(Continued)

OTHER PUBLICATIONS

International Search Report and Written Opinion in Application No. PCT/US2016/034491, dated Sep. 1, 2016, 11 pages.

*Primary Examiner* — Anthony J Amoroso
(74) *Attorney, Agent, or Firm* — Winthrop & Weinstine P.A.

(57) ABSTRACT

A service consumer may receive a market data message associated with a security. The market data message may be parsed to determine health status reference data identifying a service provider or a subprovider of the service provider. A health status subscription request may be generated using the determined health status reference data. The service consumer may receive a health status message in response to the health status subscription request. The service consumer may determine health status information associated with the service provider or the subprovider by analyzing the health status message, and may utilize the determined health status information in a selected application.

26 Claims, 20 Drawing Sheets

EXEMPLARY EP SPS PUBLISHING ARCHITECTURE

(56) References Cited

U.S. PATENT DOCUMENTS

2007/0005774 A1* 1/2007 Singh .................. H04L 63/0263
709/227
2013/0162444 A1* 6/2013 Boulanger ............... H04Q 9/00
340/870.03

* cited by examiner

EXEMPLARY EP USAGE SCENARIO

| Message Protocol | | |
|---|---|---|
| MsgKey | Name | Name of regional top-level SPS |
| | Domain | SERVICE_PROVIDER_STATUS (11) |
| | QoS | e.g., tick by tick, real time |
| Summary Data | Description | e.g., "Top-level SPS navigation" |
| | Timestamp | Timestamp when sent |
| | Frequency | Frequency of publication (e.g., in milliseconds) |
| | Failure | The number of consecutively missed messages that constitutes a failure (e.g., 3) |
| Dynamic Entries | Key | Value |
| | Provider SPS 1 MsgKey Name | Domain | SERVICE_PROVIDER_STATUS (11) |
| | | QoS | e.g., tick by tick, real time |
| | | Service_ID | Identifier of service provider 1 |
| | Provider SPS 2 MsgKey Name | Domain | SERVICE_PROVIDER_STATUS (11) |
| | | QoS | e.g., tick by tick, real time |
| | | Service_ID | Identifier of service provider 2 |

FIGURE 7

EXEMPLARY EP TOP SPS

FIGURE 8 — EXEMPLARY EP PROVIDER SPS

| Message Protocol | | |
|---|---|---|
| MsgKey | Name | Name of provider SPS |
| | Domain | SERVICE_PROVIDER_STATUS (11) |
| | QoS | e.g., tick by tick, real time |
| Summary Data | Description | e.g., description of venue or service |
| | Timestamp | Timestamp when sent |
| | Frequency | Frequency of publication (e.g., in milliseconds) |
| | Failure | The number of consecutively missed messages that constitutes a failure (e.g., 3) |
| | Alert | Information regarding content failures (e.g., data anomalies in price data supplied by the venue or service) |
| Dynamic Entries | Key | Value |
| | SubProvider SPS 1 MsgKey Name | Domain | SERVICE_PROVIDER_STATUS (11) |
| | | QoS | e.g., tick by tick, real time |
| | | Service_ID | Identifier of sub-provider 1 |
| | SubProvider SPS 2 MsgKey Name | Domain | SERVICE_PROVIDER_STATUS (11) |
| | | QoS | e.g., tick by tick, real time |
| | | Service_ID | Identifier of sub-provider 2 |

FIGURE 9

EXEMPLARY EP SUBPROVIDER SPS

| Message Protocol | | |
|---|---|---|
| MsgKey | Name | Name of sub-provider SPS |
| | Domain | SERVICE_PROVIDER_STATUS (11) |
| | QoS | e.g., tick by tick, real time |
| Data | Description | e.g., description of venue line handler |
| | Timestamp | Timestamp when sent |
| | Frequency | Frequency of publication (e.g., in milliseconds) |
| | Failure | The number of consecutively missed messages that constitutes a failure (e.g., 3) |
| | SubProvider Status | e.g., up, down, unavailable |
| | Input Feed Status | e.g., all channel pairs up, all channel pairs up but some not redundant, some channel pairs down, all channel pairs down |

| Message Protocol | | |
|---|---|---|
| MsgKey | Name | Name of input stats record |
| | Domain | SERVICE_PROVIDER_STATUS (11) |
| | QoS | e.g., tick by tick, real time |
| Data | Description | Description of the heartbeat used (e.g., "Index Calculation (U0700)" [Luxembourg Stock Exchange]) |
| | Venue Status | e.g., open or closed |
| | Last market data message update date and time | e.g., last time a market data message was received from the venue |

FIGURE 10

EXEMPLARY EP INPUT STATS RECORD

FIGURE 12

| Key | Entries | | | |
|---|---|---|---|---|
| | Score Category | Region | Description | Health Status |
| EMEA | 1 – Regional Distribution | "EMEA" | "EMEA Distribution Healthiness Score" | 1 – Healthy |
| AMER | 1 – Regional Distribution | "AMER" | "AMER Distribution Healthiness Score" | 1 – Healthy |
| APAC | 1 – Regional Distribution | "APAC" | "APAC Distribution Healthiness Score" | 1 – Healthy |
| CC1P-D-POP | 2 – D-PoP | "AMER" | "CC1P-D-POP Service Impact Score" | 1 – Healthy |
| .[SPSLS | 3 – Venue | "EMEA" | "London Stock Exchange Score" | 1 – Healthy |
| .[SPSML | 3 – Venue | "EMEA" | "Borsa Italiana Score" | 2 – Stale |
| .[SPSHKOMD | 3 – Venue | "ASIA" | "HKSE Score" | 3 – Suspected |
| .[SPSTIF | 3 – Venue | "ASIA" | "Tokyo Financial Exchange Score" | 1 – Healthy |
| .[SPSJNX | 3 – Venue | "ASIA" | "SBI Japan Next Score" | 1 – Healthy |
| ... | ... | ... | ... | ... |

EXEMPLARY EP PUBLIC INFRASTRUCTURE SPS DATA

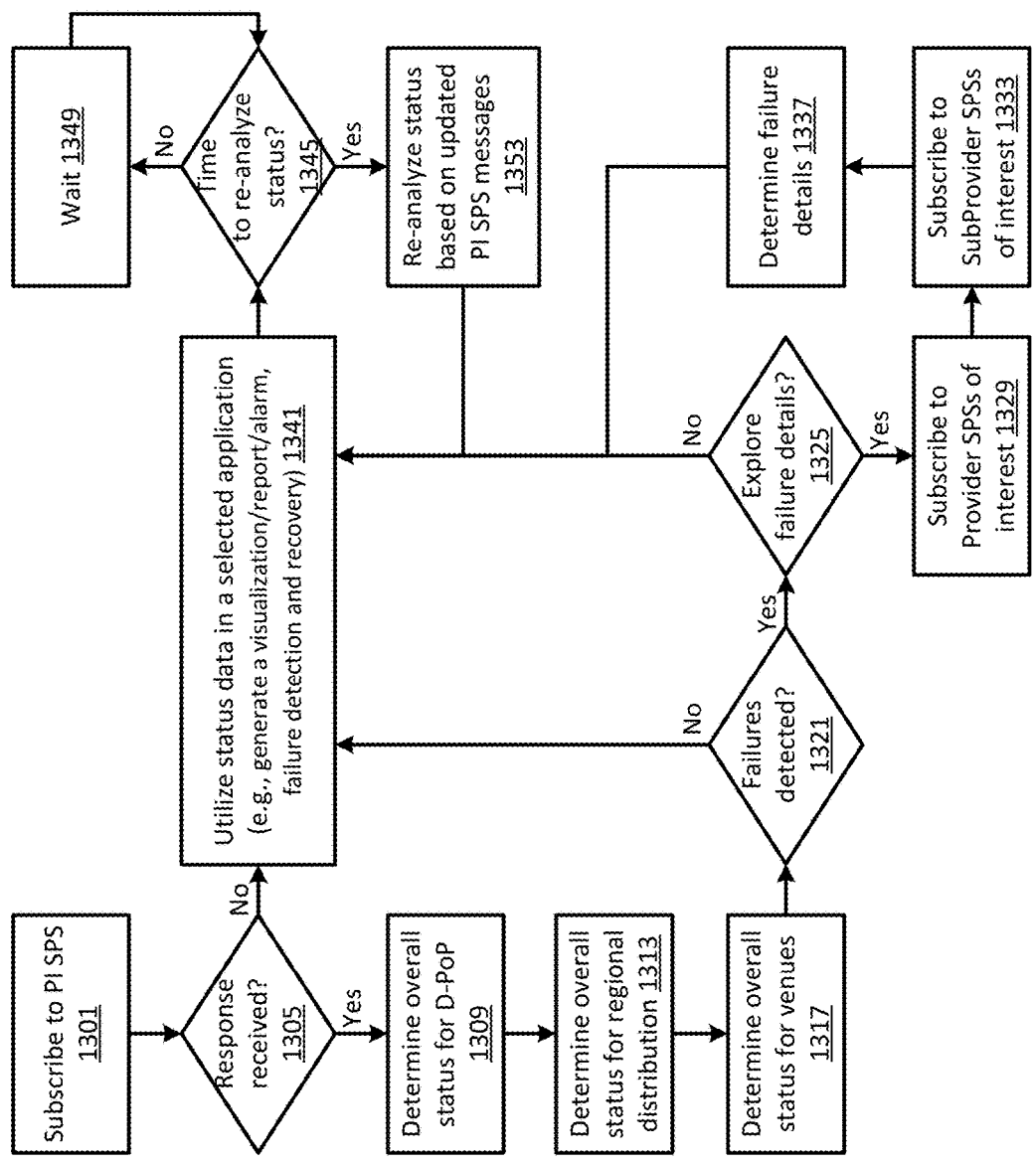

EXEMPLARY EP SCREENSHOT

FIGURE 18 — EXEMPLARY EP SCREENSHOT

EXEMPLARY EP SCREENSHOT

EXEMPLARY EP COORDINATOR

ELEKTRON PULSE METHODS, APPARATUSES AND MEDIA

This disclosure describes ELEKTRON PULSE METHODS, APPARATUSES AND MEDIA (hereinafter "EP"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

FIELD

The present disclosure is directed generally to monitoring platforms.

BACKGROUND

Currently, an operations team may monitor a network by polling individual network devices for health indicators such as error messages or breaches in tolerances. If the operations team detects a problem with the network, the operations team may send a manual alert to customers to let them know about the problem.

BRIEF DESCRIPTION OF THE FIGURES

The accompanying figures and/or appendices illustrate various exemplary embodiments in accordance with the present disclosure.

FIG. 7 shows an exemplary Top SPS message protocol in one embodiment of the EP.

FIG. 8 shows an exemplary Provider SPS message protocol in one embodiment of the EP.

FIG. 9 shows an exemplary SubProvider SPS message protocol in one embodiment of the EP.

FIG. 10 shows an exemplary input stats record message protocol in one embodiment of the EP.

FIG. 12 shows an exemplary Public Infrastructure SPS data in one embodiment of the EP.

FIG. 13 shows a logic flow diagram illustrating a Public Infrastructure SPS based processing (PISBP) component in one embodiment of the EP.

DETAILED DESCRIPTION

Introduction

The EP facilitates monitoring of real time market data systems using service provider status (SPS) messages. A consumer (e.g., a trading application) of SPS messages may utilize the EP platform to monitor the health of the delivery path and/or quality of market data content (e.g., tick by tick, in real time) from the point of ingestion of the content to the point at which the consumer consumes the content. The EP facilitates delivering SPS messages in-band (i.e., in the data stream with other market data content) allowing the consumer to react programmatically to problems to facilitate automated failure detection and recovery, and to facilitate problem prediction, notification and visualization. This helps mitigate operational risk associated with content outages (e.g., trading on incorrect content, cost of recovering systems and data, regulatory reporting costs). SPS messages are published by service providers (e.g., collection head ends responsible for obtaining market data content from an exchange and publishing the content to consumers). A service provider publishes SPS messages to let consumers know about the health status of the provider. Furthermore, summary SPS messages may be published to provide consumers with a hierarchical health summary.

Detailed Description of the EP

Figure 1:
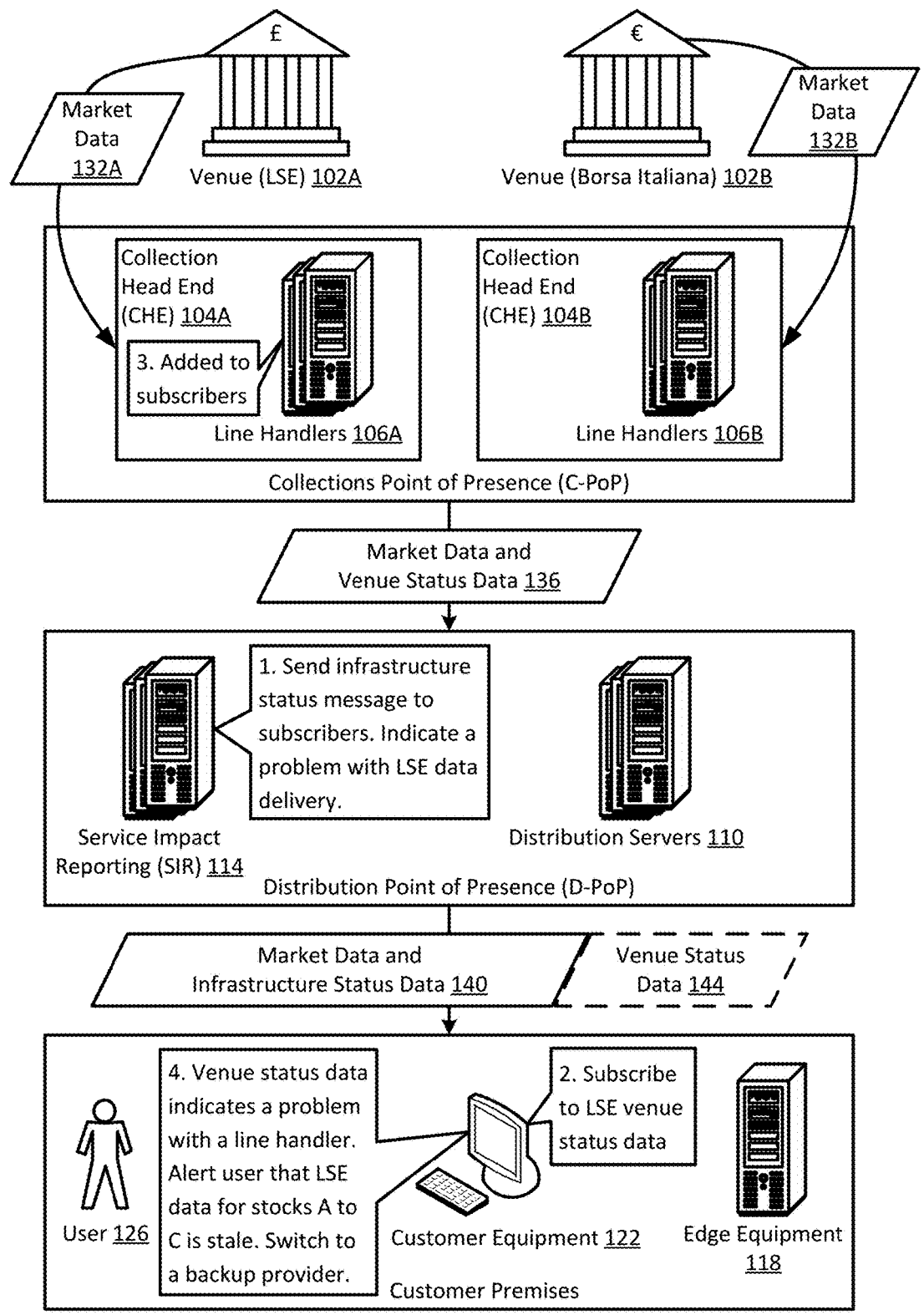
FIG. 1 shows an exemplary usage scenario in one embodiment of the EP.

FIG. 1 shows an exemplary usage scenario in one embodiment of the EP. In FIG. 1, venues 102A London Stock Exchange (LSE) and 102B Borsa Italiana provide market data 132A and 132B, respectively, to collection head ends (CHEs) 104A and 104B, respectively. For example, the market data may include ask prices, bid prices, volumes, and/or the like for securities traded on an exchange. The CHEs may be a part of a collections point of presence (C-PoP) responsible for ingesting market data content from an associated venue and providing the content to other components of the EP. CHE's 104A and 104B may be comprised of one or more line handlers (LHs) 106A and 106B, respectively. Each line handler may be responsible for processing a portion of the market data provided by the associated venue. For example, one line handler may be responsible for processing market data for stocks with identifiers that start with A through C, and another line handler may be responsible for processing market data for stocks with identifiers that start with D through F. In another example, one line handler may be responsible for processing market data for one asset class (e.g., stocks), and another line handler may be responsible for processing market data for another asset class (e.g., bonds).

Each line handler may generate (e.g., every second) SubProvider SPS messages indicating the line handler's status, and multicast the SubProvider SPS messages to subscribers. Each CHE (or another entity such as a directory SPS generating component) may generate Provider SPS messages indicating which line handlers are linked to the CHE and/or providing summary of the venue status, and multicast the Provider SPS messages to subscribers. Alternatively, SPS messages may be broadcast.

Market data and venue status data 136 may be sent via a network a distribution point of presence (D-PoP) responsible for distributing market data content in an area. The D-PoP may include distribution servers 110 that distribute market data to customers. The D-PoP may also include a service impact reporting (SIR) component 114 responsible for processing venue status data from various providers and subproviders and generating public infrastructure (PI) SPS messages that provide a consolidated health report (e.g., including overall health statuses of venues, overall health status of D-PoP service providers, overall health status of network service providers).

Market data and infrastructure status data 140 may be sent to customer premises. In one implementation, such data may be sent to edge equipment 118, which may then distribute such data to customer equipment 122 of a user 126. For example, the customer equipment may run a trading application that utilizes market data and that is a consumer subscribed to PI SPS messages.

In case of a problem with a CHE responsible for the LSE (e.g., the line handler responsible for stocks with identifiers that start with A through C has failed), the SIR may send a PI SPS message to subscribers indicating that there is a problem with LSE data delivery. This message may be delivered to the trading application, which may respond by subscribing to LSE venue status data to get more detailed information about the problem. Accordingly, LSE line handlers may add the trading application to the list of SPS message subscribers and venue status data 144 (e.g., Provider SPS messages and SubProvider SPS messages) may be delivered to the trading application. The trading application may get a SubProvider SPS message indicating a problem with the failed line handler, or may interpret that the line handler failed based on a lack of SPS messages from the failed line handler. Accordingly, the trading application may react in various ways. For example, the trading application may inform the user that market data for LSE stocks with identifiers that start with A through C is stale and/or prevent the user from trading such stocks. In another example, the trading application may switch to a backup provider of market data for these stocks. Once the problem with the line handler is fixed, the trading application may unsubscribe from LSE venue status data (e.g., to reduce the load on the network and/or processing resources).

Figure 2:
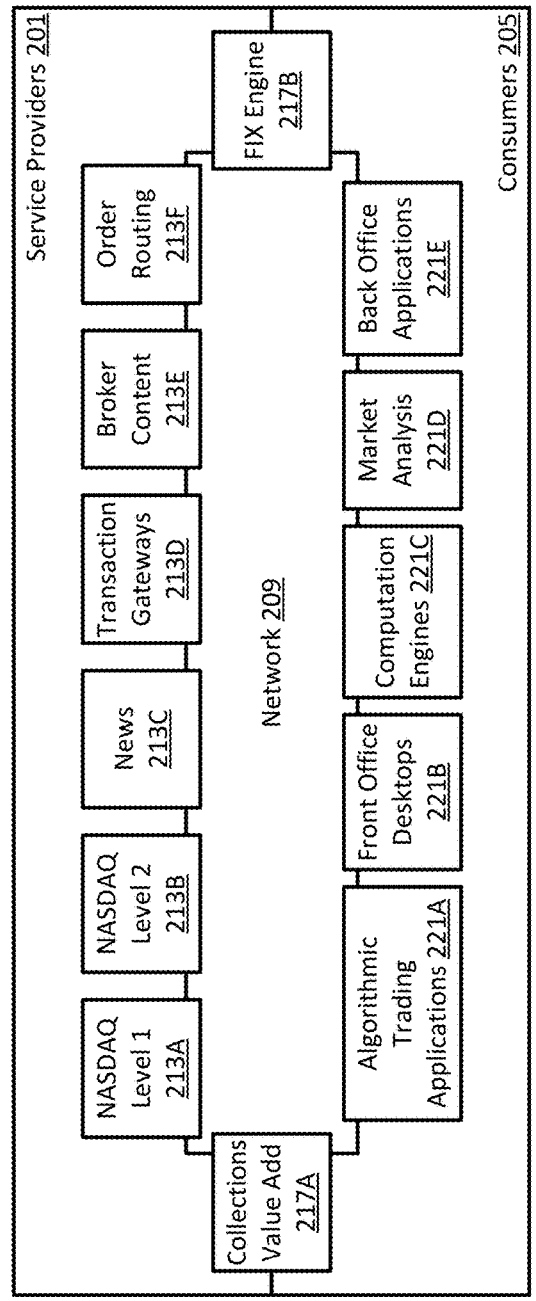
FIG. 2 shows an exemplary service providers and consumers model in one embodiment of the EP.

FIG. 2 shows an exemplary service providers and consumers model in one embodiment of the EP. In FIG. 2, service providers 201 implement services and multicast SPS messages, and consumers 205 consume these services and SPS messages. Providers and consumers are interconnected via a network 209. In one embodiment, providers may provide content. For example, provider 213A provides NASDAQ Level 1 data content, provider 213B provides NASDAQ Level 2 data content, and provider 213C provides news data content. In another embodiment, providers may provide capabilities. For example, provider 213D provides transaction gateways capabilities, provider 213E provides broker content capabilities, and provider 213F provides order routing capabilities. In some embodiments, components may be both service providers and consumers. For example, such components may include the collections value add component 217A and FIX engine 217B. In another example, such components may include a component of the network that consumes content from a C-PoP and provides such content to a D-PoP. In various embodiments, consumers may include algorithmic trading applications 221A, front office desktops 221B, computation engines 221C, market analysis components 221D, back office applications 221E, and/or the like.

Figure 3:
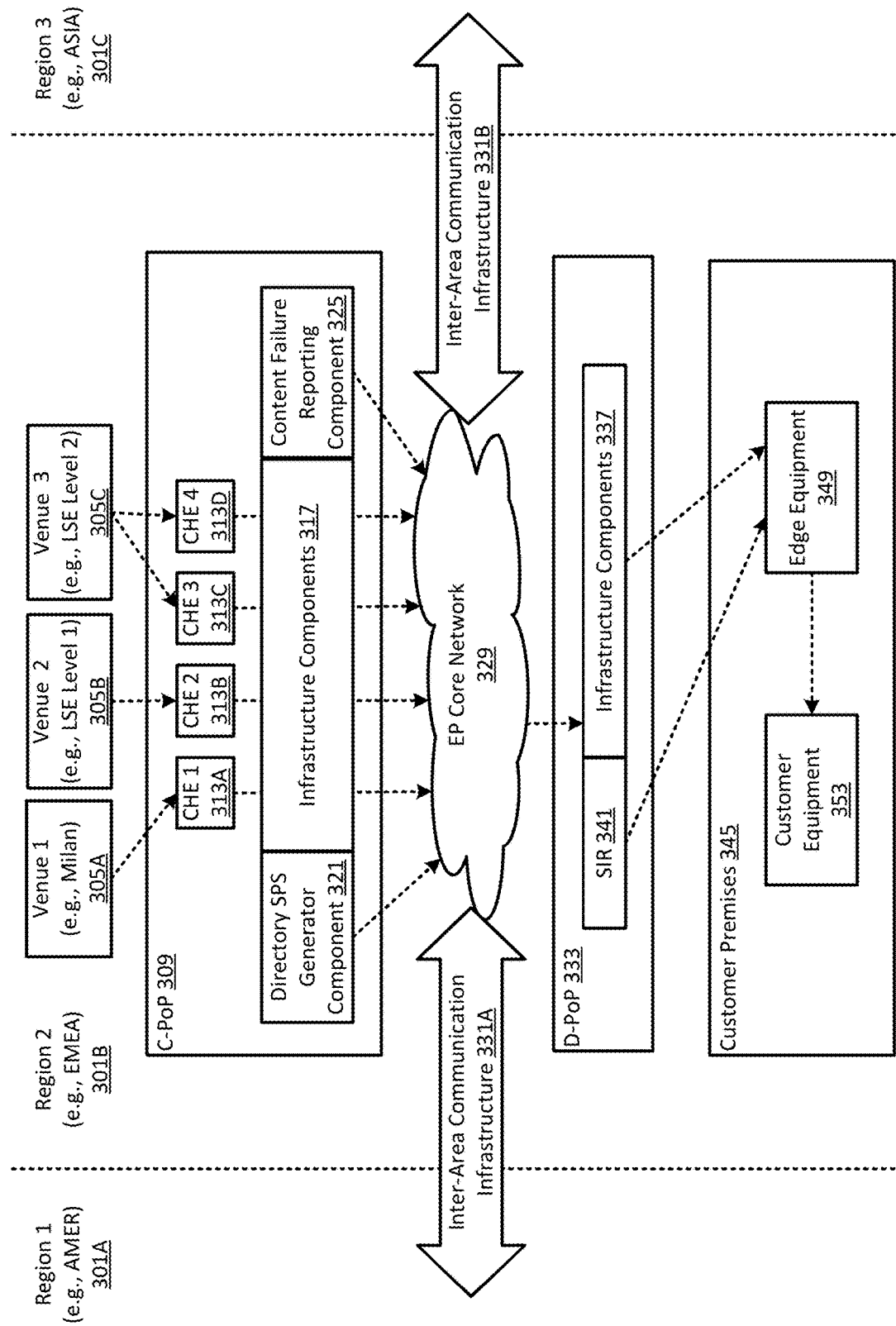
FIG. 3 shows a block diagram illustrating an exemplary EP architecture in one embodiment of the EP.

FIG. 3 shows a block diagram illustrating an exemplary EP architecture in one embodiment of the EP. In FIG. 3, the EP may span a plurality of geographic regions. For example, region 1 301A may be associated with AMER (Americas), region 2 301B may be associated with EMEA (Europe, Middle East, Africa) and region 3 301C may be associated with Asia.

A region may include one or more venues that provide data feeds or other services to a C-PoP 309 associated with the region. For example, region 2 may include venue 305A that provides a feed of Milan market data content to a CHE 313A, venue 305B that provides a feed of LSE Level 1 market data content to a CHE 313B, and venue 305C that provides a feed of LSE Level 2 market data content to CHEs 313C and 313D. It is to be understood that the EP may be utilized with any type of content or service provided by a venue. In some embodiments, input feeds from a source (e.g., an exchange such as LSE) may be treated as different venues (e.g., a venue for Level 1 data and a venue for Level 2 data, a venue for each service). In some embodiments, multiple input feeds from a source (e.g., an exchange such as NASDAQ) may be treated as one venue (e.g., the UTDF (trade data feed) and UQDF (quotation data feed) may be combined to form NASDAQ Level 1 venue).

The CHEs may process the received input feeds via their line handlers and publish market data content to subscriber consumers, such as via infrastructure components 317, using a specified message protocol. The CHEs and/or their line handlers may also publish SPS messages (e.g., Provider SPS messages and SubProvider SPS messages, respectively) using the specified message protocol to subscriber consumers. Accordingly, a consumer may receive market data content messages and SPS messages in one data stream. Other service providers associated with C-PoP components (e.g., a service provider that is a part of the C-PoP infrastructure components) may also publish SPS messages regarding their health status to subscriber consumers.

A directory SPS generator component 321 may publish a set of SPS messages that facilitate navigating SPS messages and/or mapping SPS messages to venues. In one embodiment, the directory SPS generator component may publish Provider SPS messages that facilitate determining subproviders associated with each provider to subscriber consumers. In another embodiment, the directory SPS generator component may publish Top SPS messages that facilitate determining providers in the region to subscriber consumers.

A content failure reporting component 325 may monitor content for errors (e.g., data anomalies in price data supplied by a venue or service provider). Various techniques may be utilized to detect errors (e.g., detecting that the price of a security provided in a data feed is outside expected bounds based on a threshold difference in standard deviations between the average price of the security over a specified time period and the provided price value in the data feed). The content failure reporting component may publish a set of SPS messages regarding detected content errors to subscriber consumers (e.g., a provider that wishes to include content failure data in its Provider SPS messages).

The infrastructure components, the directory SPS generator component, the content failure reporting component, and/or the like may publish their data streams (e.g., including market data content and SPS messages) to subscriber consumers via a regional EP core network 329. Data streams may be passed across regions using inter-area communication infrastructure (e.g., inter-area WAN) 331A (e.g., to send data to and receive data from region 1) and 331B (e.g., to send data to and receive data from region 3). Service providers associated with regional EP core networks (e.g., a service provider that is a part of the regional EP core network) and/or the inter-area communication infrastructures (e.g., a service provider that is a part of an inter-area communication infrastructure) may also publish SPS messages regarding their health status to subscriber consumers.

A D-PoP 333 associated with the region (e.g., one of a plurality of D-PoPs that serve the region) may obtain published data streams via the EP core network. Infrastructure components 337 may be used to publish the obtained data (e.g., including market data content and SPS messages) to subscriber consumers served by the D-PoP. The D-PoP may include a SIR component 341 that may process SPS messages from various providers and subproviders and publish PI SPS messages that provide a consolidated health report (e.g., including overall health statuses of venues, overall health status of D-PoP service providers, and overall health status of network service providers) to subscriber consumers. Service providers associated with D-PoP components (e.g., a service provider that is a part of the D-PoP infrastructure components) may also publish SPS messages regarding their health status to subscriber consumers.

Customer premises 345 may include edge equipment 349 and customer equipment 353 (e.g., workstations used by traders employed by the customer). The edge equipment may obtain published data streams from the D-PoP that serves the customer premises and provide the data streams to the customer equipment. For example, the customer equipment may run a consumer trading application that utilizes market data content to facilitate trading activities and SPS messages to facilitate error detection and recovery. In some embodiments, the edge equipment may publish Top SPS messages that facilitate determining available providers (e.g., available in the region and authorized by the EP for the customer's use) and/or Provider SPS messages that facilitate determining subproviders associated with each provider to subscriber consumers running on the customer equipment.

Figure 4:
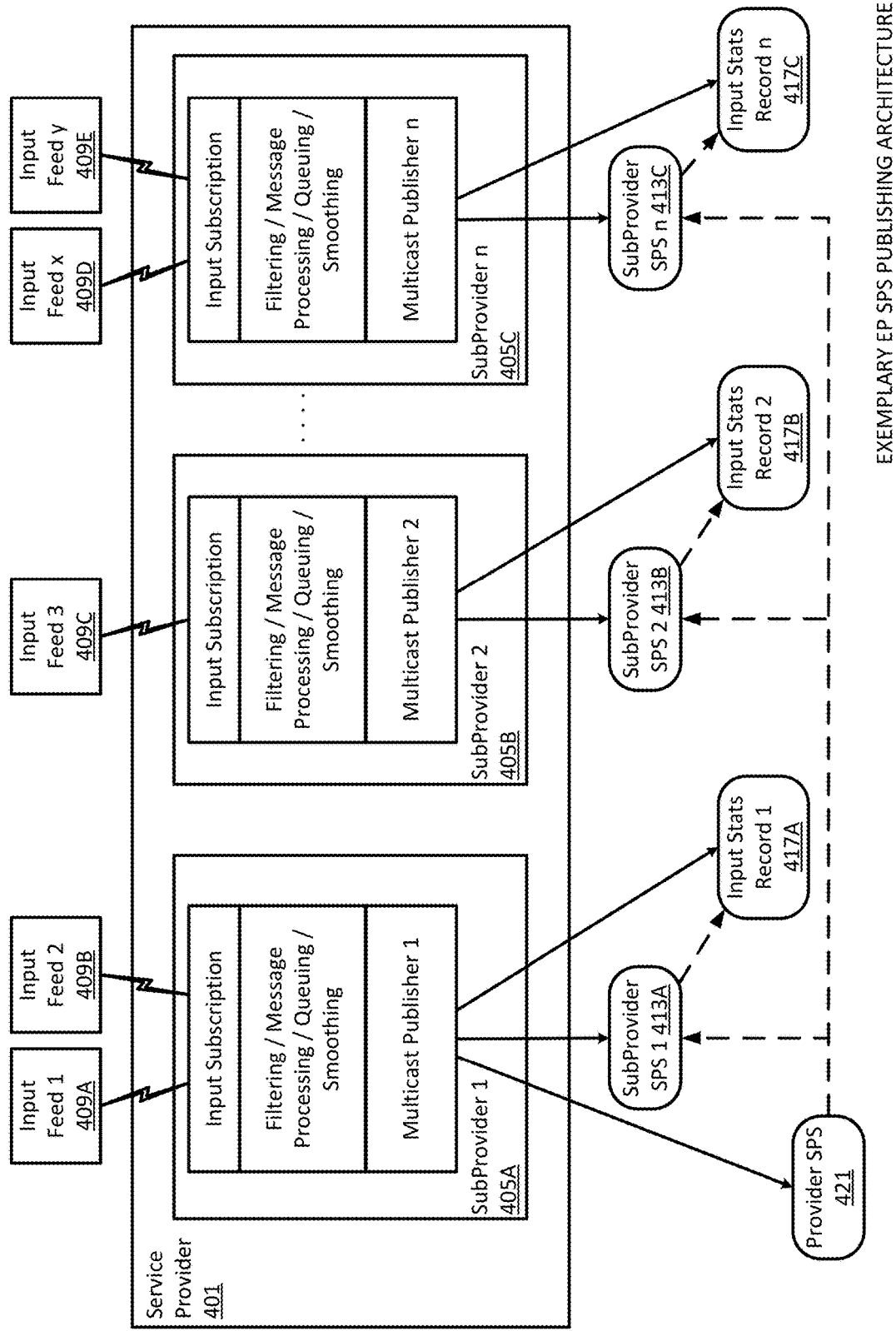
FIG. 4 shows a block diagram illustrating an exemplary SPS publishing architecture in one embodiment of the EP.

FIG. 4 shows a block diagram illustrating an exemplary SPS publishing architecture in one embodiment of the EP. In FIG. 4, solid arrows indicate SPS messages published by subproviders and dashed arrows indicate how SPS messages are linked. FIG. 4 shows a service provider 401 that includes subprovider 1 405A, subprovider 2 405B, and subprovider n 405C. For example, the provider may be a CHE and the subproviders may be line handlers of the CHE. Each subprovider includes components to obtain subscribed-to input feeds; filter, process, queue, smooth, and/or the like the obtained data; and multicast the resulting data to subscriber consumers. Input feeds are not shared between different subproviders. For example, input feed 1 409A and input feed 2 409B are handled by subprovider 1, input feed 3 409C is handled by subprovider 2, and input feed x 409D and input feed y 409E are handled by subprovider n. Each subprovider multicasts SubProvider SPS messages. Accordingly, subprovider 1 may publish SubProvider SPS 1 messages 413A, subprovider 2 may publish SubProvider SPS 2 messages 413B, and subprovider n may publish SubProvider SPS n messages 413C. Each subprovider may also multicast input stats records that provide health status of the subprovider's input feeds (e.g., the gap in seconds between the last time that a message was received via an input feed). Accordingly, subprovider 1 may publish input stats record 1 messages 417A, subprovider 2 may publish input stats record 2 messages 417B, and subprovider n may publish input stats record n messages 417C. The service provider (or another entity such as a directory SPS generating component) may also multicast Provider SPS messages 421 that link SubProvider SPS messages and input stats record messages to the provider. In one implementation, one of the subproviders (e.g., subprovider 1) may publish Provider SPS messages. In another implementation, another component of the provider may publish Provider SPS messages.

Figure 5:
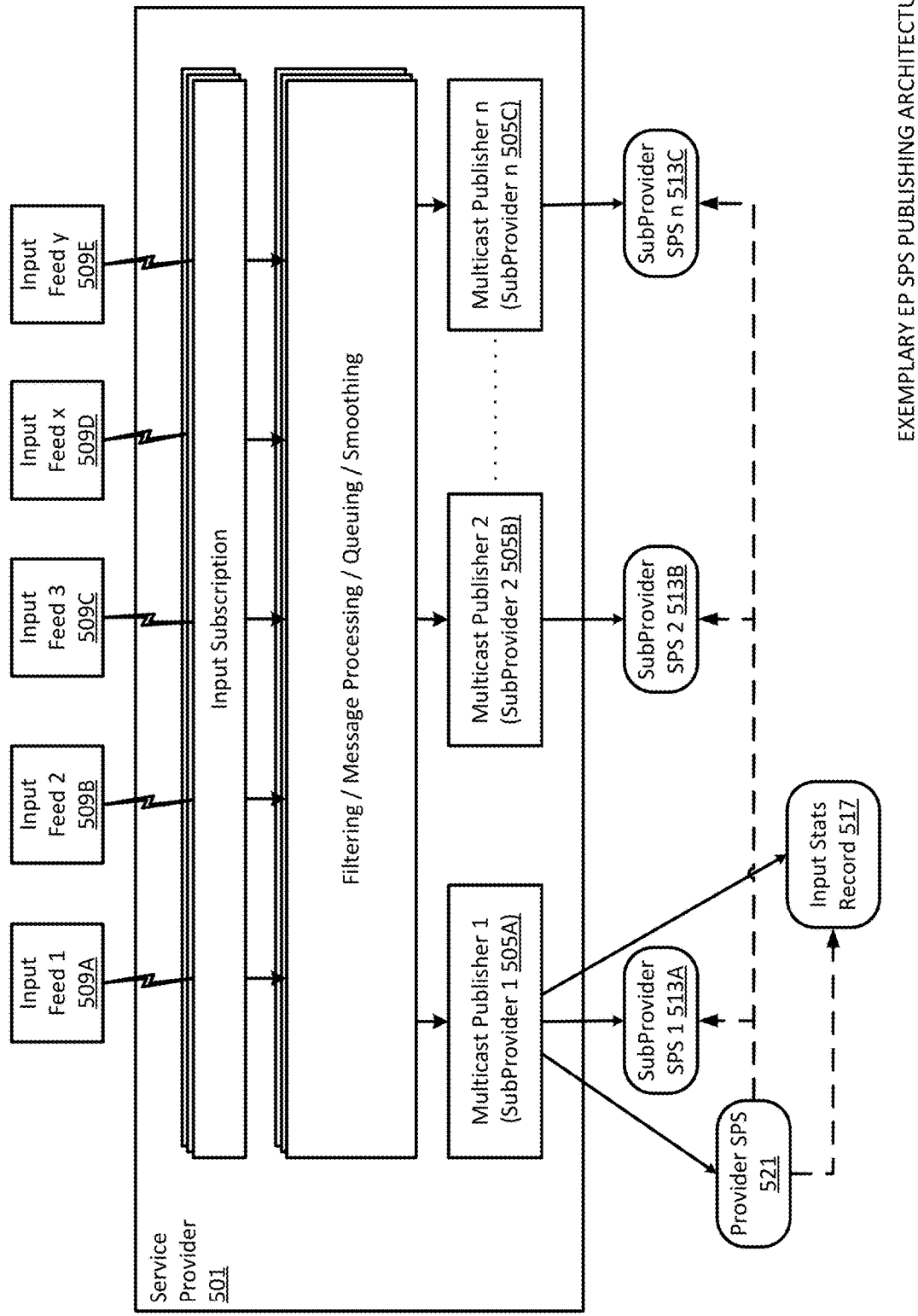
FIG. 5 shows a block diagram illustrating an exemplary SPS publishing architecture in one embodiment of the EP.

FIG. 5 shows a block diagram illustrating an exemplary SPS publishing architecture in one embodiment of the EP. In FIG. 5, solid arrows indicate SPS messages published by subproviders and dashed arrows indicate how SPS messages are linked. FIG. 5 shows a service provider 501 that includes subprovider 1 505A, subprovider 2 505B, and subprovider n 505C. For example, the provider may be a traffic management system (TMS) that protects downstream subscriber consumers from surges in network traffic (e.g., a part of C-PoP or D-PoP infrastructure components) and the subproviders may be publisher components of the TMS. The provider includes components to obtain subscribed-to input feeds; filter, process, queue, smooth, and/or the like the obtained data; and multicast the resulting data to subscriber consumers. Input feeds are shared between different subproviders. For example, input feed 1 509A, input feed 2 509B, input feed 3 509C, input feed x 509D and input feed y 509E may be handled by any of the subproviders. Each subprovider multicasts SubProvider SPS messages. Accordingly, subprovider 1 may publish SubProvider SPS 1 messages 513A, subprovider 2 may publish SubProvider SPS 2 messages 513B, and subprovider n may publish SubProvider SPS n messages 513C. The provider may also multicast input stats record messages 517 that provide health status of the provider's input feeds. In one implementation, one of the subproviders (e.g., subprovider 1) may publish input stats record messages. In another implementation, another component of the provider may publish input stats record messages. The service provider (or another entity such as a directory SPS generating component) may also multicast Provider SPS messages 521 that link SubProvider SPS messages and input stats record messages to the provider. In one implementation, one of the subproviders (e.g., subprovider 1) may publish Provider SPS messages. In another implementation, another component of the provider may publish Provider SPS messages.

Figure 6:
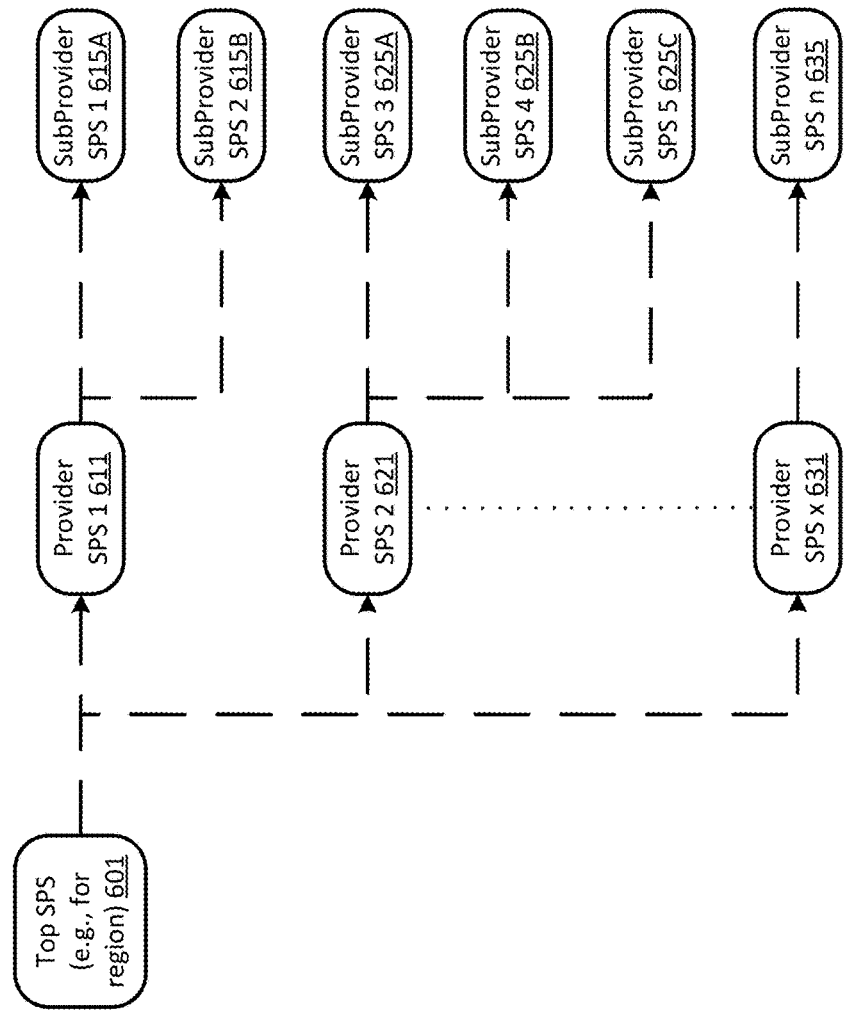
FIG. 6 shows an exemplary SPS model in one embodiment of the EP.

FIG. 6 shows an exemplary SPS model in one embodiment of the EP. In FIG. 6, a Top SPS message 601 may carry linkages to provider level items available within a region (e.g., different providers may be available in different regions). The provider level items may include Provider SPS 1 611, Provider SPS 2 621, and Provider SPS x 631. The provider level items may be associated with providers in the region, with providers in the inter-area communication infrastructure, with providers in other regions (e.g., a CHE in another region whose data is available in the region), and/or the like. A provider's Provider SPS message may carry linkages to subprovider level items associated with the provider and/or the provider's health status information. Accordingly, Provider SPS 1 may carry linkages to SubProvider SPS 1 615A and SubProvider SPS 2 615B; Provider SPS 2 may carry linkages to SubProvider SPS 3 625A, SubProvider SPS 4 625B and SubProvider SPS 5 625C; and Provider SPS x may carry linkages to SubProvider SPS n 635. A subprovider's SubProvider SPS message may carry the subprovider's health status information. In one embodiment, a SubProvider SPS message may carry the overall health status of the subprovider. For example, if the subprovider is a failover entity (e.g., operating in quad-redundant (live-standby-standby-standby) or dual redundant (live-standby) mode, such as by replicating hardware or software), the SubProvider SPS message may indicate that the subprovider is healthy if at least one of the replicas is functioning and that the subprovider is stale if none of the replicas is functioning. In another embodiment, a SubProvider SPS message may carry detailed health status of the subprovider. For example, the SubProvider SPS message may indicate that the subprovider is suspect if there is a loss of resiliency (e.g., at least one of the replicas is not functioning). In some embodiments, Provider SPS messages and/or SubProvider SPS messages may carry linkages to input stats record messages that provide health status information associated with input feeds (e.g., whether the venue providing an input feed is open or closed, the last time a market data message was received from the venue). In some embodiments, different versions of SPS messages may be utilized (e.g., to reduce the load on the network and/or processing resources). For example, a full version may be sent initially to a consumer. In another example, an update version may be sent subsequently to the consumer that includes changed data while leaving out unchanged data.

FIG. 7 shows an exemplary Top SPS message protocol in one embodiment of the EP. In FIG. 7, an exemplary structure of a Top SPS message is shown. A Top SPS message provides a discovery mechanism for consumers to determine available providers. A consumer may subscribe to Top SPS messages (e.g., via an API call) by specifying data illustrated in MsgKey section such as a name (e.g., which may be used to subscribe to regional Top SPS messages), a domain (e.g., to differentiate SPS messages from other messages, such as market data messages, utilizing the message protocol), QoS (quality of service associated with Top SPS messages, such as tick by tick), and/or the like. A Top SPS message sent to the consumer may include a Summary Data portion that may include data fields such as a description (e.g., describing contents of the message), a timestamp (e.g., when the message was sent), a frequency of publication (e.g., every 10 minutes—to let consumers know about changes to available providers), a failure indicator (e.g., how many consecutively missed messages constitute a failure of the provider of Top SPS messages), and/or the like. A Top SPS message sent to the consumer may include a Dynamic Entries portion that may include information regarding available providers linked to by the Top SPS. In one implementation, this information may be stored as a map of key/value pairs in which a key specifies the name of a provider (e.g., which may be used to subscribe to the provider's Provider SPS messages) and the corresponding value is a set of additional data that the consumer may use to subscribe to Provider SPS messages (e.g., domain, QoS) and/or to get additional details regarding the provider (e.g., based on the provider's Service_ID). Information regarding providers may be added and/or removed from the Dynamic Entries portion of Top SPS messages as providers become available (e.g., a new provider is brought online) and unavailable (e.g., a provider fails).

FIG. 8 shows an exemplary Provider SPS message protocol in one embodiment of the EP. In FIG. 8, an exemplary structure of a Provider SPS message is shown. A Provider SPS message provides a discovery mechanism for consumers to determine available subproviders and/or an input stats record for a provider, and/or carries the provider's health status information. A consumer may subscribe to Provider SPS messages (e.g., via an API call) by specifying data illustrated in MsgKey section such as a name (e.g., which may be used to subscribe to the provider's Provider SPS messages), a domain (e.g., to differentiate SPS messages from other messages, such as market data messages, utilizing the message protocol), QoS (quality of service associated with Provider SPS messages, such as tick by tick), and/or the like. A Provider SPS message sent to the consumer may include a Summary Data portion that may include data fields such as a description (e.g., describing contents of the message, describing the provider), a timestamp (e.g., when the message was sent), a frequency of publication (e.g., every second—to let consumers know the provider's updated health status information), a failure indicator (e.g., how many consecutively missed messages constitute a failure of the provider), an alert indicator (e.g., information regarding content failures), and/or the like. A Provider SPS message sent to the consumer may include a Dynamic Entries portion that may include information regarding available subproviders linked to by the Provider SPS. In one implementation, this information may be stored as a map of key/value pairs in which a key specifies the name of a subprovider (e.g., which may be used to subscribe to the subprovider's SubProvider SPS messages) and the corresponding value is a set of additional data that the consumer may use to subscribe to SubProvider SPS messages (e.g., domain, QoS) and/or to get additional details regarding the subprovider (e.g., based on the subprovider's Service_ID). Information regarding subproviders may be added and/or removed from the Dynamic Entries portion of Provider SPS messages as subproviders become available (e.g., a new subprovider is brought online) and unavailable (e.g., a subprovider fails).

FIG. 9 shows an exemplary SubProvider SPS message protocol in one embodiment of the EP. In FIG. 9, an exemplary structure of a SubProvider SPS message is shown. A SubProvider SPS message provides a discovery mechanism for consumers to determine an input stats record for a subprovider and/or carries the subprovider's health status information. A consumer may subscribe to SubProvider SPS messages (e.g., via an API call) by specifying data illustrated in MsgKey section such as a name (e.g., which may be used to subscribe to the subprovider's SubProvider SPS messages), a domain (e.g., to differentiate SPS messages from other messages, such as market data messages, utilizing the message protocol), QoS (quality of service associated with SubProvider SPS messages, such as tick by tick), and/or the like. A SubProvider SPS message sent to the consumer may include a Data portion that may include data fields such as a description (e.g., describing contents of the message, describing the subprovider), a timestamp (e.g., when the message was sent), a frequency of publication (e.g., every second—to let consumers know the subprovider's updated health status information), a failure indicator (e.g., how many consecutively missed messages constitute a failure of the subprovider), a subprovider status (e.g., up, down, unavailable), input feed status (e.g., all channels up, all channels up but some are not redundant, some channels down, all channels down), and/or the like.

FIG. 10 shows an exemplary input stats record message protocol in one embodiment of the EP. In FIG. 10, an exemplary structure of an input stats record message is shown. An input stats record message carries an input feed's health status information. A consumer may subscribe to input stats record messages (e.g., via an API call) by specifying data illustrated in MsgKey section such as a name (e.g., which may be used to subscribe to the input stats record messages of a provider or subprovider), a domain (e.g., to differentiate SPS messages from other messages, such as market data messages, utilizing the message protocol), QoS (quality of service associated with input stats record messages, such as tick by tick), and/or the like. An input stats record message sent to the consumer may include a Data portion that may include data fields such as a description (e.g., describing contents of the message, describing the input feed), a timestamp (e.g., when the message was sent), a frequency of publication (e.g., every second—to let consumers know the input feed's updated health status information), a venue status (e.g., whether the venue providing the input feed is open or closed), a last update status (e.g., the last time a market data message was received from the venue), and/or the like.

Figure 11:
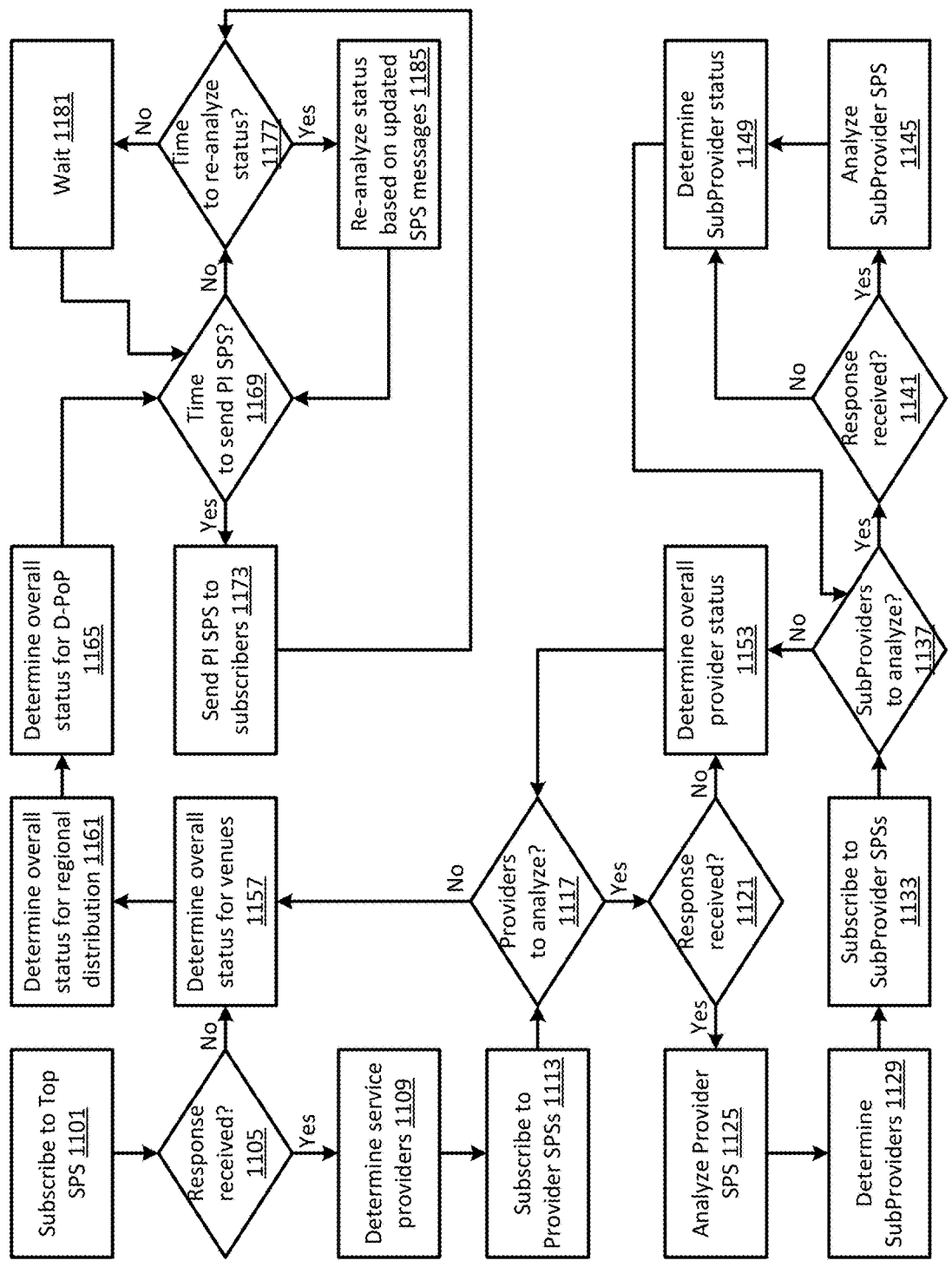
FIG. 11 shows a logic flow diagram illustrating a Public Infrastructure SPS generating (PISG) component in one embodiment of the EP.

FIG. 11 shows a logic flow diagram illustrating a Public Infrastructure SPS generating (PISG) component in one embodiment of the EP. In FIG. 11, a request to subscribe to Top SPS messages may be sent at 1101. For example, the SIR component may subscribe to Top SPS messages to discover available service providers in the SIR's region. In one implementation, the request to subscribe may be sent via a C++ API call that specifies the kind of data illustrated in Top SPS MsgKey section of the message protocol.

A determination may be made at 1105 whether a response has been received. If a Top SPS message has not been received within a specified time period, it may be determined that the provider of Top SPS messages is down or that the EP platform is not functioning. If a Top SPS message has been received, available service providers may be determined at 1109. In one implementation, available providers may be determined by iterating through keys of dynamic entries of the Top SPS message.

Requests to subscribe to Provider SPS messages may be sent at 1113. For example, the SIR component may subscribe to Provider SPS messages to discover subproviders for each provider. In one implementation, the requests to subscribe may be sent via C++ API calls that specify the kind of data illustrated in Provider SPS MsgKey section of the message protocol. For example, a name may be obtained by analyzing the key portion and additional data may be obtained by analyzing the corresponding value portion of the dynamic entries of the Top SPS message.

A determination may be made at 1117 whether there are providers to analyze. In one implementation, each subscribed-to provider may be analyzed. If there remain providers to analyze, a provider may be selected for analysis and a determination may be made at 1121 whether a response has been received from the provider. If a Provider SPS message has not been received within a specified time period, it may be determined that the provider is not functioning. If a Provider SPS message has been received, the message may be analyzed at 1125 to determine health status information. For example, an alert indicator field of the message may be analyzed to determine whether there are content failures.

Subproviders associated with the provider may be determined at 1129. In one implementation, subproviders associated with the provider may be determined by iterating through keys of dynamic entries of the Provider SPS message.

Requests to subscribe to the SubProvider SPS messages may be sent at 1133. For example, the SIR component may subscribe to SubProvider SPS messages to determine health status information for each subprovider associated with the provider. In one implementation, the requests to subscribe may be sent via C++ API calls that specify the kind of data illustrated in SubProvider SPS MsgKey section of the message protocol. For example, a name may be obtained by analyzing the key portion and additional data may be obtained by analyzing the corresponding value portion of the dynamic entries of the Provider SPS message.

A determination may be made at 1137 whether there are subproviders associated with the provider to analyze. In one implementation, each subscribed-to subprovider may be analyzed. If there remain subproviders to analyze, a subprovider may be selected for analysis and a determination may be made at 1141 whether a response has been received from the subprovider. If a SubProvider SPS message has not been received within a specified time period, it may be determined that the subprovider is not functioning. If a SubProvider SPS message has been received, the message may be analyzed at 1145 to determine health status information. For example, subprovider status field of the message may be analyzed to determine whether the subprovider is up or down. In another example, input feed status field of the message may be analyzed to determine whether there are any problems with the subprovider's input feed. In yet another example, latency statistics field of the message may be analyzed to determine latency statistics associated with the subprovider.

The subprovider's status may be determined at 1149. In one embodiment, the subprovider's status may represent the overall health status of the subprovider. In one implementation, if analysis of the SubProvider SPS message indicates that there are no problems, the subprovider may be considered healthy. In another implementation, if a SubProvider SPS message has not been received or if analysis of the SubProvider SPS message indicates that the subprovider is not functioning, the subprovider may be considered unhealthy. In yet another implementation, if analysis of the SubProvider SPS message indicates that the subprovider is functioning but some of the resiliency has been lost (e.g., some of the replicas are down), the subprovider may be considered suspect.

The provider's overall status may be determined at 1153. In one embodiment, the provider's overall status may represent the overall health status of the provider. In one implementation, if analysis of the Provider SPS message indicates that there are no problems and each of the provider's subproviders is healthy, the provider may be considered healthy. In another implementation, if a Provider SPS message has not been received or if analysis of the Provider SPS message indicates that the provider is not functioning or if at least one of the provider's subproviders is unhealthy, the provider may be considered unhealthy. In yet another implementation, if analysis of the Provider SPS message indicates that the subprovider is functioning but some of the resiliency has been lost (e.g., some of the input feed channels are down) or if at least one of the provider's subproviders is suspect, the provider may be considered suspect.

If providers have been analyzed, overall status for venues may be determined at 1157. In one embodiment, providers that are considered to be venues may be determined (e.g., based on the description field of Provider SPS messages), and the overall health status of each such provider may be determined based on the analysis. In another embodiment, a combined overall health status may be determined (e.g., if each venue is healthy, the combined overall health status may be set as healthy; if a Top SPS message has not been received within a specified time period, the EP platform may be malfunctioning and the combined overall health status may be set as unknown).

Overall status for regional distribution may be determined at 1161. In one embodiment, providers for each region that are considered to be a part of regional distribution (e.g., infrastructure components of C-PoP in the region, EP core network in the region, inter-area communication infrastructures in the region) may be determined (e.g., based on the description field of Provider SPS messages), and the overall health status for each regional distribution may be determined based on the analysis (e.g., if each provider that is considered to be a part of regional distribution is healthy, the overall health status for regional distribution may be set as healthy). In another embodiment, a combined overall health status may be determined (e.g., if each regional distribution is healthy, the combined overall health status may be set as healthy; if a Top SPS message has not been received within a specified time period, the EP platform may be malfunctioning and the combined overall health status may be set as unknown).

Overall status for associated D-PoP (e.g., the D-PoP associated with the SIR component) may be determined at 1165. In one embodiment, providers that are considered to be a part of the D-PoP may be determined (e.g., based on the description field of Provider SPS messages), and the overall health status for the D-PoP may be determined based on the analysis (e.g., if each provider that is considered to be a part of the D-PoP is healthy, the overall health status for the D-PoP may be set as healthy; if a Top SPS message has not been received within a specified time period, the EP platform may be malfunctioning and the overall health status for the D-PoP may be set as unknown). In another embodiment, overall status for multiple D-PoPs may be determined (e.g., if a customer is served by multiple D-PoPs, it may be desirable to publish the overall health status for each D-PoP that serves the customer).

A determination may be made at 1169 whether it is time to send a PI SPS message to subscribers (e.g., consumers that subscribed to the SIR component's PI SPS messages). For example, PI SPS messages may be sent in accordance with a predetermined frequency (e.g., every second). In another example, if the EP platform is malfunctioning a PI SPS message may not be sent.

If it is time to send a PI SPS message, data regarding the overall status for venues, overall status for regional distribution, overall status for D-PoP, and/or the like may be included as part of the PI SPS message, and the PI SPS message may be generated and sent to subscriber consumers at 1173. PI SPS messages may be sent continuously at a specified frequency (e.g., every second) to keep subscriber consumers informed regarding updated health status of venues, regional distribution, D-PoP, and/or the like.

A determination may be made at 1177 whether it is time to reanalyze status data. In one implementation, status data may be reanalyzed periodically. In another implementation, status data may be reanalyzed in real time when updated SPS messages are received. If it is not yet time to reanalyze status data, the PISG component may wait at 1181. If it is time to reanalyze status data, status data may be reanalyzed (e.g., in a similar manner as described with regard to 1101 through 1165, but without having to subscribe to SPS messages unless there are changes with regard to which providers and/or subproviders are available) based on updated SPS messages (e.g., updated Top SPS messages, Provider SPS messages, SubProvider SPS messages, input stats record messages) at 1185. SPS messages, with regard to which the PISG component is a subscriber consumer, may be sent continuously to the PISG component at specified frequencies (e.g., a SubProvider SPS message for a particular subprovider may be sent every second) to keep the PISG component informed regarding updated health status of providers and/or subproviders. If it is time to send the next PI SPS message, the next PI SPS message may be generated using reanalyzed status data and sent to subscriber consumers.

FIG. 12 shows an exemplary Public Infrastructure SPS data in one embodiment of the EP. FIG. 12 shows data that may be included in a PI SPS message sent to a subscriber consumer. In one implementation, the consumer may access the data by iterating through elements in a map of key/value pairs in which a key of an element specifies the name of a venue, regional distribution or D-PoP, and the corresponding value of the element is a set of entries that describe the element and/or provide health status information for the element. In one embodiment, the key of an element may identify a provider (e.g., for venues). Accordingly, the consumer may get additional details regarding the element by subscribing to the provider's SPS messages. In another embodiment, the key of an element may identify a non-provider entity (e.g., regional distribution or D-PoP), and the entries may include information regarding providers that are included in the non-provider entity. Accordingly, the consumer may get additional details regarding the element by subscribing to SPS messages of the included providers.

FIG. 13 shows a logic flow diagram illustrating a Public Infrastructure SPS based processing (PISBP) component in one embodiment of the EP. In FIG. 13, a request to subscribe to PI SPS messages may be sent at 1301. For example, a consumer may wish to monitor the health of the delivery path and/or quality of market data content utilized by the consumer. In one implementation, the request to subscribe may be sent via a C++ API call (e.g., by specifying the name of the provider of PI SPS messages at the consumer's D-PoP, SPS domain, and tick by tick QoS).

A determination may be made at 1305 whether a response has been received. If a PI SPS message has not been received within a specified time period, it may be determined that the provider of PI SPS messages at the consumer's D-PoP is down or that the EP platform is not functioning.

If a PI SPS message has been received, the PI SPS message may be analyzed at 1309 to determine overall health status for the D-PoP. In one implementation, the element of a map included in the PI SPS message that provides health status information for the D-PoP may be parsed to determine the D-PoP's health status. For example, the health status may be healthy (if the D-PoP is considered healthy), stale (if the D-PoP is considered unhealthy), or suspected (if the D-PoP is considered suspect).

The PI SPS message may be analyzed at 1313 to determine overall health status for regional distribution. In one implementation, the elements of a map included in the PI SPS message that provides health status information for regional distributions may be parsed to determine each regional distribution's health status. For example, the health status may be healthy (if regional distribution is considered healthy), stale (if regional distribution is considered unhealthy), or suspected (if regional distribution is considered suspect).

The PI SPS message may be analyzed at 1317 to determine overall health status for venues. In one implementation, the elements of a map included in the PI SPS message that provides health status information for venues may be parsed to determine each venue's health status. For example, the health status may be healthy (if a venue is considered healthy), stale (if a venue is considered unhealthy), or suspected (if a venue is considered suspect).

A determination may be made at 1321 whether failures have been detected. In one embodiment, if any entity (e.g., the D-PoP, regional distribution, venue) is not healthy, a failure may be detected. In another embodiment, if any entity is stale, a failure may be detected, but entities that are suspected may not be treated as failures.

If it is determined that a failure has been detected, a determination may be made at 1325 whether failure details should be explored. In one embodiment, the consumer may wish to explore details of any failures that occur. In another embodiment, the consumer may wish to explore details of failures of entities that are stale, but not of entities that are suspected. In yet another embodiment, a set of entities may be specified for which details of failures should be explored.

If it is determined that failure details should be explored, the consumer may subscribe to Provider SPS messages of providers of interest at 1329 and to SubProvider SPS messages of subproviders of interest at 1333. Using information in these SPS messages, the consumer may determine failure details at 1337. For example, if the PI SPS message indicates that the venue Borsa Italiana is stale, the consumer may subscribe to Provider SPS messages of the CHE responsible for this venue. Based on a received Provider SPS message, the consumer may subscribe to SubProvider SPS messages and/or input stats record messages of line handlers associated with the CHE. The consumer may parse the details of such SPS messages to determine details regarding the failure (e.g., one of the line handlers of the CHE failed).

Information provided in the PI SPS message and/or additional details determined by the consumer may be utilized in a selected application at 1341. In one embodiment, a visualization may be generated. For example, a map (e.g., geographical, organizational, logical, physical, functional, topological) showing health status of monitored components may be generated (e.g., components that are healthy may be shown as green, components that are stale may be shown as red, and components that are suspected may be shown as amber). In another example, a heat map showing health status of monitored components may be generated. In another embodiment, a report (e.g., a table, a chart) showing health status of monitored components may be generated. For example, a report showing current, past, and/or predicted failures may be generated. In another example, a report showing the impact of a failure may be generated (e.g., percentage of affected records in different levels (whole universe, venue, asset class), specific records that are affected). In yet another example, hardware devices and/or software processes associated with a failure may be determined. In yet another embodiment, an alert (e.g., an in-app notification, a text message, an email) may be generated. For example, a user associated with the consumer may be alerted that there is a failure (e.g., any failure, a failure that affects a security on the user's watchlist). In another example, if a PI SPS message has not been received within a specified time period, an alert may be generated to inform the user that the EP platform may be malfunctioning. In yet another embodiment, failure detection and recovery may be facilitated. For example, a user associated with the consumer may be prevented from executing trades for securities associated with a failed CHE and/or line handler, or associated with a content failure. In another example, the consumer may switch to a backup provider of market data for a venue associated with a failed CHE and/or line handler, or associated with a CHE whose latency is outside acceptable bounds. In yet another example, the consumer may adjust the delivery path (e.g., infrastructure components, EP core network components, inter-area communication infrastructure) to switch from using providers that are down or that have latency that is outside acceptable bounds to using healthy providers. It is to be understood that users may access such features using a variety of client devices (e.g., a desktop, a laptop, a tablet, a smartphone), and that such features may be implemented in a variety of ways (e.g., a desktop application, a web app, a webpage, a mobile app).

A determination may be made at 1345 whether it is time to reanalyze status data. In one implementation, status data may be reanalyzed periodically. In another implementation, status data may be reanalyzed in real time when an updated PI SPS message is received and/or when updated Provider SPS messages, SubProvider SPS messages, input stats record messages used to determine failure details are received. If it is not yet time to reanalyze status data, the PISBP component may wait at 1349. If it is time to reanalyze status data, status data may be reanalyzed (e.g., in a similar manner as described with regard to 1301 through 1341, but subscribing to SPS messages of providers and/or subproviders with new failures and unsubscribing from SPS messages of providers and/or subproviders that no longer have failures) based on updated SPS messages (e.g., updated PI SPS messages and/or Provider SPS messages, SubProvider SPS messages, input stats record messages used to determine failure details) at 1353. SPS messages, with regard to which the PISBP component is a subscriber consumer, may be sent continuously to the PISBP component at specified frequencies (e.g., a SubProvider SPS message for a particular subprovider may be sent every second) to keep the PISBP component informed regarding updated health status of venues, regional distribution, D-PoP, providers, subproviders, and/or the like. The reanalyzed data may be utilized in a selected application (e.g., to update a map, report, alert status, selected data providers, selected delivery path).

Figure 14:
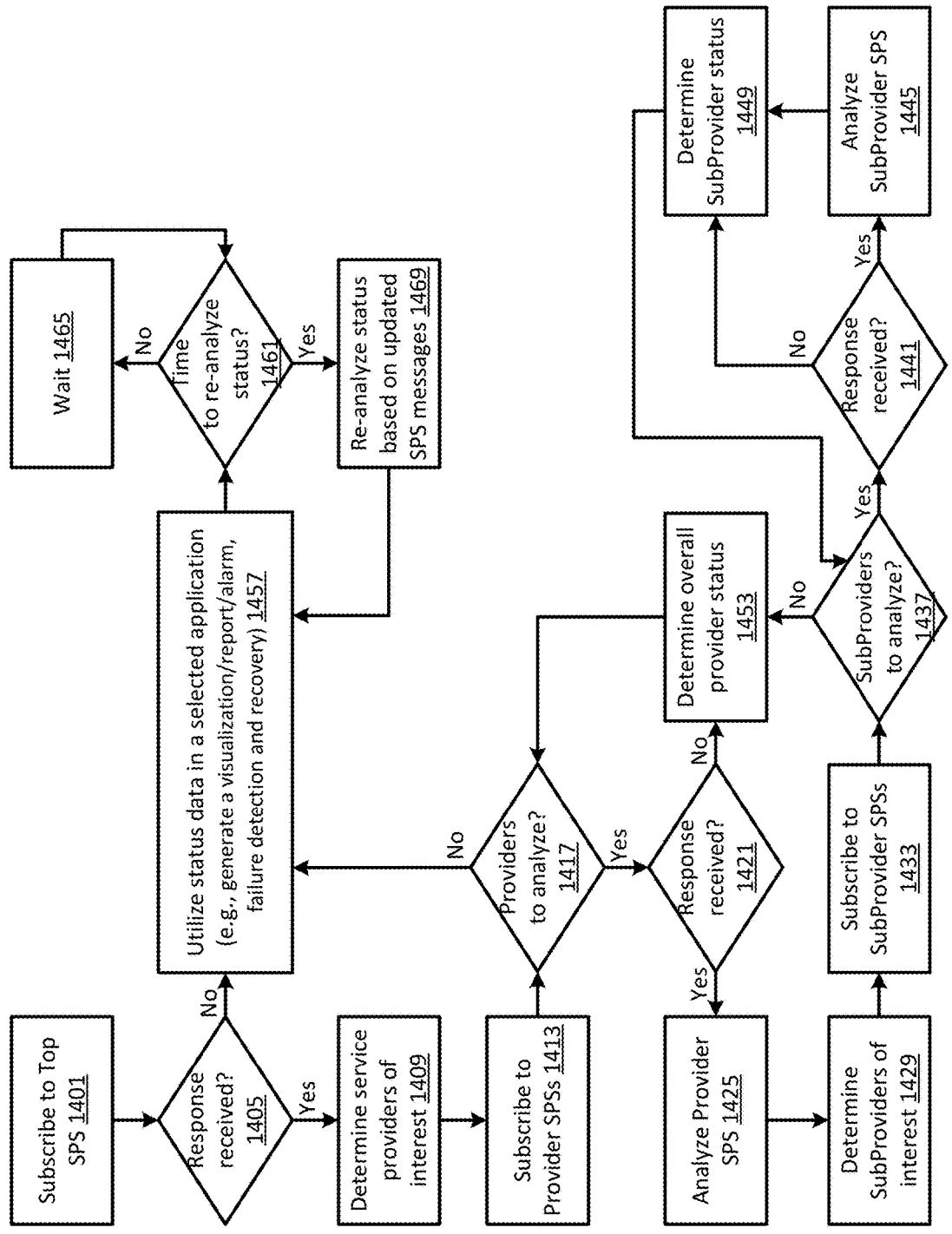
FIG. 14 shows a logic flow diagram illustrating a Top SPS based processing (TSBP) component in one embodiment of the EP.

FIG. 14 shows a logic flow diagram illustrating a Top SPS based processing (TSBP) component in one embodiment of the EP. In FIG. 14, a request to subscribe to Top SPS messages may be sent at 1401. For example, a consumer may wish to monitor the health of the delivery path and/or quality of market data content utilized by the consumer. In one implementation, the request to subscribe may be sent via a C++ API call (e.g., by specifying the name of the provider of Top SPS messages, SPS domain, and tick by tick QoS).

A determination may be made at 1405 whether a response has been received. If a Top SPS message has not been received within a specified time period, it may be determined that the provider of Top SPS messages is down or that the EP platform is not functioning.

If a Top SPS message has been received, service providers of interest to the consumer may be determined at 1409. In one implementation, available providers may be determined by iterating through keys of dynamic entries of the Top SPS message and providers of interest may be selected from the available providers (e.g., by analyzing information about each available provider based on Service_ID). For example, the consumer may be interested in any provider. In another example, the consumer may be interested in providers (e.g., CHEs) associated with one or more venues of interest (e.g., stock exchanges on which a user associated with the consumer executes trades) and/or providers associated with the delivery path from such venues to the consumer.

Requests to subscribe to Provider SPS messages may be sent at 1413. For example, the consumer may subscribe to Provider SPS messages to discover subproviders for each provider of interest to the consumer. In one implementation, the requests to subscribe may be sent via C++ API calls (e.g., by specifying the name of a provider of interest, SPS domain, and tick by tick QoS). For example, the name of a provider of interest may be obtained by analyzing the key portion and additional data may be obtained by analyzing the corresponding value portion of the dynamic entry of the Top SPS message associated with the provider.

A determination may be made at 1417 whether there are providers of interest to analyze. In one implementation, each subscribed-to provider may be analyzed. If there remain providers to analyze, a provider may be selected for analysis and a determination may be made at 1421 whether a response has been received from the provider. If a Provider SPS message has not been received within a specified time period, it may be determined that the provider is not functioning. If a Provider SPS message has been received, the message may be analyzed at 1425 to determine health status information. For example, an alert indicator field of the message may be analyzed to determine whether there are content failures.

Subproviders of interest to the consumer associated with the provider may be determined at 1429. In one implementation, subproviders associated with the provider may be determined by iterating through keys of dynamic entries of the Provider SPS message and subproviders of interest may be selected from the available subproviders (e.g., by analyzing information about each available subprovider based on Service_ID). For example, the consumer may be interested in any subprovider. In another example, the consumer may be interested in subproviders (e.g., line handlers) associated with securities of interest (e.g., securities on a watchlist of a user associated with the consumer).

Requests to subscribe to the SubProvider SPS messages may be sent at 1433. For example, the consumer may subscribe to SubProvider SPS messages to determine health status information for each subprovider of interest associated with the provider. In one implementation, the requests to subscribe may be sent via C++ API calls (e.g., by specifying the name of a subprovider of interest, SPS domain, and tick by tick QoS). For example, the name of a subprovider of interest may be obtained by analyzing the key portion and additional data may be obtained by analyzing the corresponding value portion of the dynamic entry of the Provider SPS message associated with the subprovider.

A determination may be made at 1437 whether there are subproviders of interest associated with the provider to analyze. In one implementation, each subscribed-to subprovider may be analyzed. If there remain subproviders to analyze, a subprovider may be selected for analysis and a determination may be made at 1441 whether a response has been received from the subprovider. If a SubProvider SPS message has not been received within a specified time period, it may be determined that the subprovider is not functioning. If a SubProvider SPS message has been received, the message may be analyzed at 1445 to determine health status information. For example, the subprovider status field of the message may be analyzed to determine whether the subprovider is up or down. In another example, the input feed status field of the message may be analyzed to determine whether there are any problems with the subprovider's input feed. In yet another example, the latency statistics field of the message may be analyzed to determine latency statistics associated with the subprovider.

The subprovider's status may be determined at 1449. In one embodiment, the subprovider's status may represent the overall health status of the subprovider. In one implementation, if analysis of the SubProvider SPS message indicates that there are no problems, the subprovider may be considered healthy. In another implementation, if a SubProvider SPS message has not been received or if analysis of the SubProvider SPS message indicates that the subprovider is not functioning, the subprovider may be considered unhealthy. In yet another implementation, if analysis of the SubProvider SPS message indicates that the subprovider is functioning but some of the resiliency has been lost (e.g., some of the replicas are down), the subprovider may be considered suspect.

The provider's overall status may be determined at 1453. In one embodiment, the provider's overall status may represent the overall health status of the provider. In one implementation, if analysis of the Provider SPS message indicates that there are no problems and each of the provider's subproviders of interest is healthy, the provider may be considered healthy. In another implementation, if a Provider SPS message has not been received or if analysis of the Provider SPS message indicates that the provider is not functioning or if at least one of the provider's subproviders of interest is unhealthy, the provider may be considered unhealthy. In yet another implementation, if analysis of the Provider SPS message indicates that the subprovider is functioning but some of the resiliency has been lost (e.g., some of the input feed channels are down) or if at least one of the provider's subproviders of interest is suspect, the provider may be considered suspect.

If providers have been analyzed, information regarding the health status of providers of interest and/or subproviders of interest to the consumer may be utilized in a selected application at 1457. In one embodiment, a visualization may be generated. For example, a map (e.g., geographical, organizational, logical, physical, functional, topological) showing health status of monitored components may be generated (e.g., components that are healthy may be shown as green, components that are stale may be shown as red, and components that are suspected may be shown as amber). In another example, a heat map showing health status of monitored components may be generated. In another embodiment, a report (e.g., a table, a chart) showing health status of monitored components may be generated. For example, a report showing current, past, and/or predicted failures may be generated. In another example, a report showing the impact of a failure may be generated (e.g., percentage of affected records in different levels (whole universe, venue, asset class), specific records that are affected). In yet another example, hardware devices and/or software processes associated with a failure may be determined. In yet another embodiment, an alert (e.g., an in-app notification, a text message, an email) may be generated. For example, a user associated with the consumer may be alerted that there is a failure (e.g., any failure, a failure that affects a security on the user's watchlist). In another example, if a Top SPS message has not been received within a specified time period, an alert may be generated to inform the user that the EP platform may be malfunctioning. In yet another embodiment, failure detection and recovery may be facilitated. For example, a user associated with the consumer may be prevented from executing trades for securities associated with a failed CHE and/or line handler, or associated with a content failure. In another example, the consumer may switch to a backup provider of market data for a venue associated with a failed CHE and/or line handler, or associated with a CHE whose latency is outside acceptable bounds. In yet another example, the consumer may adjust the delivery path (e.g., infrastructure components, EP core network components, inter-area communication infrastructure) to switch from using providers that are down or that have latency that is outside acceptable bounds to using healthy providers. It is to be understood that users may access such features using a variety of client devices (e.g., a desktop, a laptop, a tablet, a smartphone), and that such features may be implemented in a variety of ways (e.g., a desktop application, a web app, a webpage, a mobile app).

A determination may be made at 1461 whether it is time to reanalyze status data. In one implementation, status data may be reanalyzed periodically. In another implementation, status data may be reanalyzed in real time when updated Top SPS messages, Provider SPS messages, SubProvider SPS messages, and/or input stats record messages are received. If it is not yet time to reanalyze status data, the TSBP component may wait at 1465. If it is time to reanalyze status data, status data may be reanalyzed (e.g., in a similar manner as described with regard to 1401 through 1457, but without having to subscribe to SPS messages unless there are changes with regard to which providers and/or subproviders of interest are available) based on updated SPS messages (e.g., updated Top SPS messages, Provider SPS messages, SubProvider SPS messages, and/or input stats record messages) at 1469. SPS messages, with regard to which the TSBP component is a subscriber consumer, may be sent continuously to the TSBP component at specified frequencies (e.g., a SubProvider SPS message for a particular subprovider may be sent every second) to keep the TSBP component informed regarding updated health status of providers, subproviders, and/or the like. The reanalyzed data may be utilized in a selected application (e.g., to update a map, report, alert status, selected data providers, selected delivery path).

Figure 15:
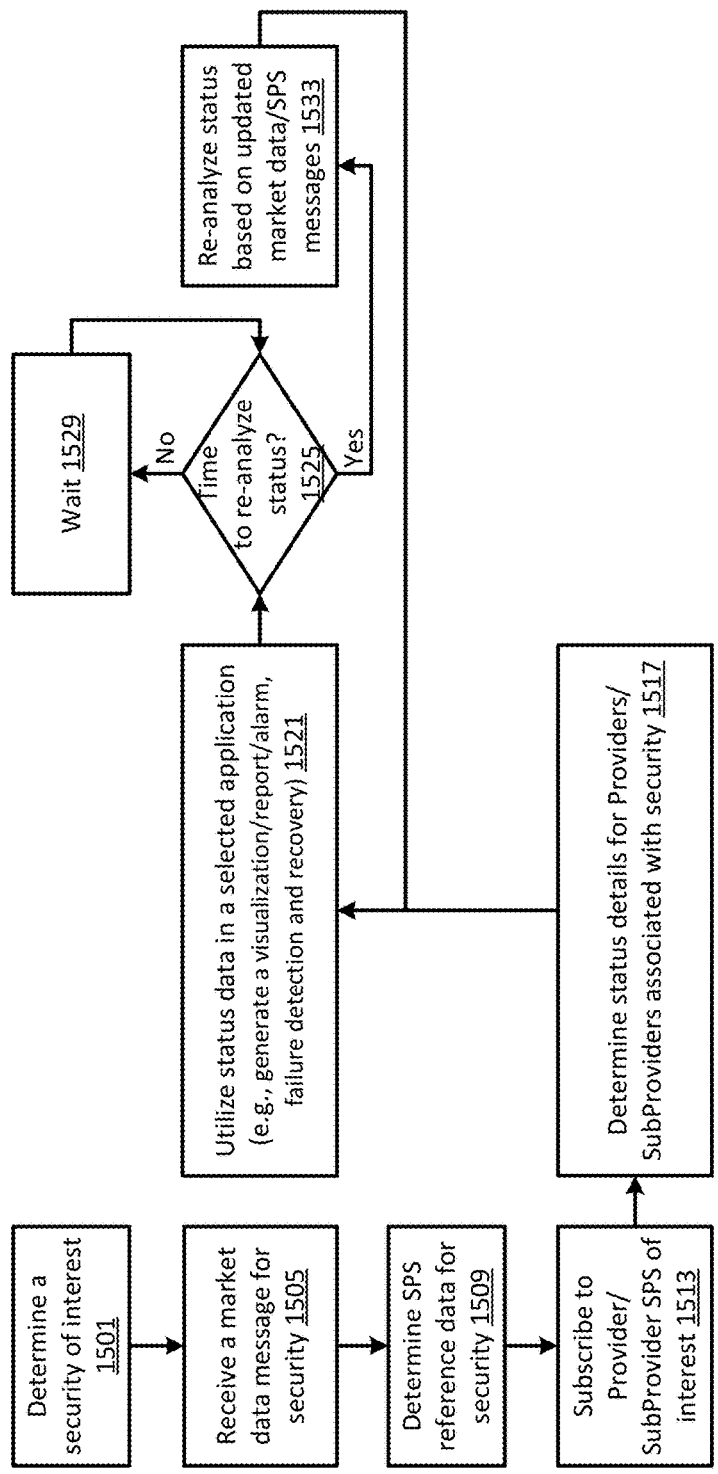
FIG. 15 shows a logic flow diagram illustrating a watchlist based processing (WBP) component in one embodiment of the EP.

FIG. 15 shows a logic flow diagram illustrating a watch-list based processing (WBP) component in one embodiment of the EP. In FIG. 15, a security of interest to a consumer may be determined at 1501. For example, a consumer may wish to monitor the health of the delivery path and/or quality of market data content associated with a security on a watchlist of a user associated with the consumer.

A market data message associated with the security of interest may be received at 1505. The market data message may utilize the same message protocol as that utilized by SPS messages. Accordingly, the consumer may differentiate between market data messages and SPS messages (e.g., based on the domain field), and utilize market data messages for trading activities (e.g., to display bid and ask prices of the security) and SPS messages for health status monitoring activities (e.g., to make sure that prices shown to the user are correct).

SPS reference data for the security may be determined at 1509. In one embodiment, the market data message may include data fields with SPS reference data. In various implementations, SPS reference data for the security may include information regarding providers and/or subproviders associated with the health status of the market data for the security. For example, the market data message may include the name of the provider (e.g., CHE) and/or the name of the subprovider (e.g., line handler) that supplied the market data in the market data message. In another example, the market data message may include the names of providers and/or subproviders associated with the delivery path of the market data message (e.g., providers and/or subproviders that handled the market data associated with the market data message as it traveled between a CHE and the consumer).

The consumer may subscribe to Provider SPS messages of providers of interest and/or to SubProvider SPS messages of subproviders of interest at 1513. In one implementation, the consumer may subscribe to SPS messages of any provider and/or subprovider referenced (e.g., directly or indirectly) by the market data message. For example, if the market data message references a provider and the provider's subprovider, the consumer may subscribe to Provider SPS messages of the provider and/or to SubProvider SPS messages of the subprovider. In another example, if the market data message references a provider, the consumer may subscribe to Provider SPS messages of the provider and/or to SubProvider SPS messages of subproviders associated with the provider.

Health status details for providers and/or subproviders of interest associated with the security may be determined at 1517. In one implementation, the received Provider SPS messages, SubProvider SPS messages, input stats records, and/or the like may be analyzed to determine health status details (e.g., whether each provider, subprovider, input feed and/or the like is healthy, unhealthy or suspect).

Information regarding the health status of providers and/or subproviders of interest associated with the security may be utilized in a selected application at 1521. In one embodiment, a visualization may be generated. For example, a map (e.g., geographical, organizational, logical, physical, functional, topological) showing health status of monitored components may be generated (e.g., components that are healthy may be shown as green, components that are stale may be shown as red, and components that are suspected may be shown as amber). In another example, a heat map showing health status of monitored components may be generated. In another embodiment, a report (e.g., a table, a chart) showing health status of monitored components may be generated. For example, a report showing current, past, and/or predicted failures may be generated. In another example, a report showing the impact of a failure may be generated (e.g., percentage of affected records in different levels (whole universe, venue, asset class), specific records that are affected). In yet another example, hardware devices and/or software processes associated with a failure may be determined. In yet another embodiment, an alert (e.g., an in-app notification, a text message, an email) may be generated. For example, a user associated with the consumer may be alerted that there is a failure that affects the security on the user's watchlist. In yet another embodiment, failure detection and recovery may be facilitated. For example, a user associated with the consumer may be prevented from executing trades for the security if the security is associated with a failed CHE and/or line handler, or associated with a content failure. In another example, the consumer may switch to a backup provider of market data for a venue associated with the security if the security is associated with a failed CHE and/or line handler, or associated with a CHE whose latency is outside acceptable bounds. In yet another example, the consumer may adjust the delivery path (e.g., infrastructure components, EP core network components, inter-area communication infrastructure) to switch from using providers that are down or that have latency that is outside acceptable bounds to using healthy providers. It is to be understood that users may access such features using a variety of client devices (e.g., a desktop, a laptop, a tablet, a smartphone), and that such features may be implemented in a variety of ways (e.g., a desktop application, a web app, a webpage, a mobile app).

A determination may be made at 1525 whether it is time to reanalyze status data. In one implementation, status data may be reanalyzed periodically. In another implementation, status data may be reanalyzed in real time when updated market data messages and/or SPS messages are received. If it is not yet time to reanalyze status data, the WBP component may wait at 1529. If it is time to reanalyze status data, status data may be reanalyzed based on updated market data messages and/or SPS messages at 1533. The reanalyzed data may be utilized in a selected application (e.g., to update a map, report, alert status, selected data providers, selected delivery path).

Figure 16:
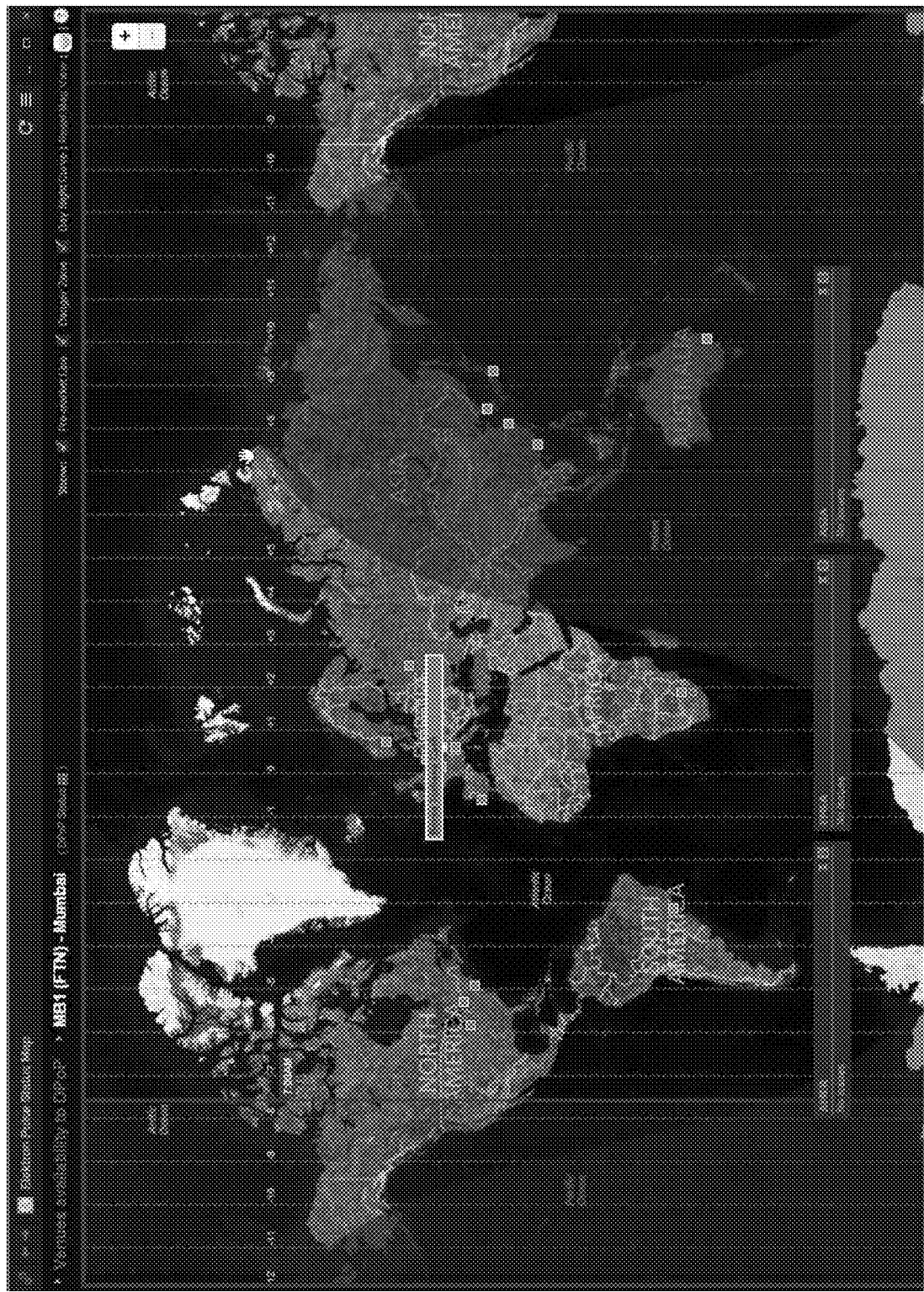
FIG. 16 shows a screen shot diagram in one embodiment of the EP.

FIG. 16 shows a screen shot diagram in one embodiment of the EP. In FIG. 16, an exemplary health status map is shown. The health status map shows venues availability to D-PoP MB1(FTN)-Mumbai (e.g., one of the D-PoPs that may be selected for analysis). The map shows that there are no issues with data from any of the venues in the three regions (AMER, EMEA, ASIA). Each venue is represented on the map as a square, which is green to show that there are no problems with the venue. The map may also show features such as pre-market line, danger zone, day night curve, and/or the like. A user may zoom in and out to get a better view of the health status in an area of interest. In one implementation, zooming in on a venue beyond a first predefined threshold may show health status information of CHEs associated with the venue. In another implementation, zooming in on a venue beyond a second predefined threshold may show health status information of line handlers associated with the venue.

Figure 17:
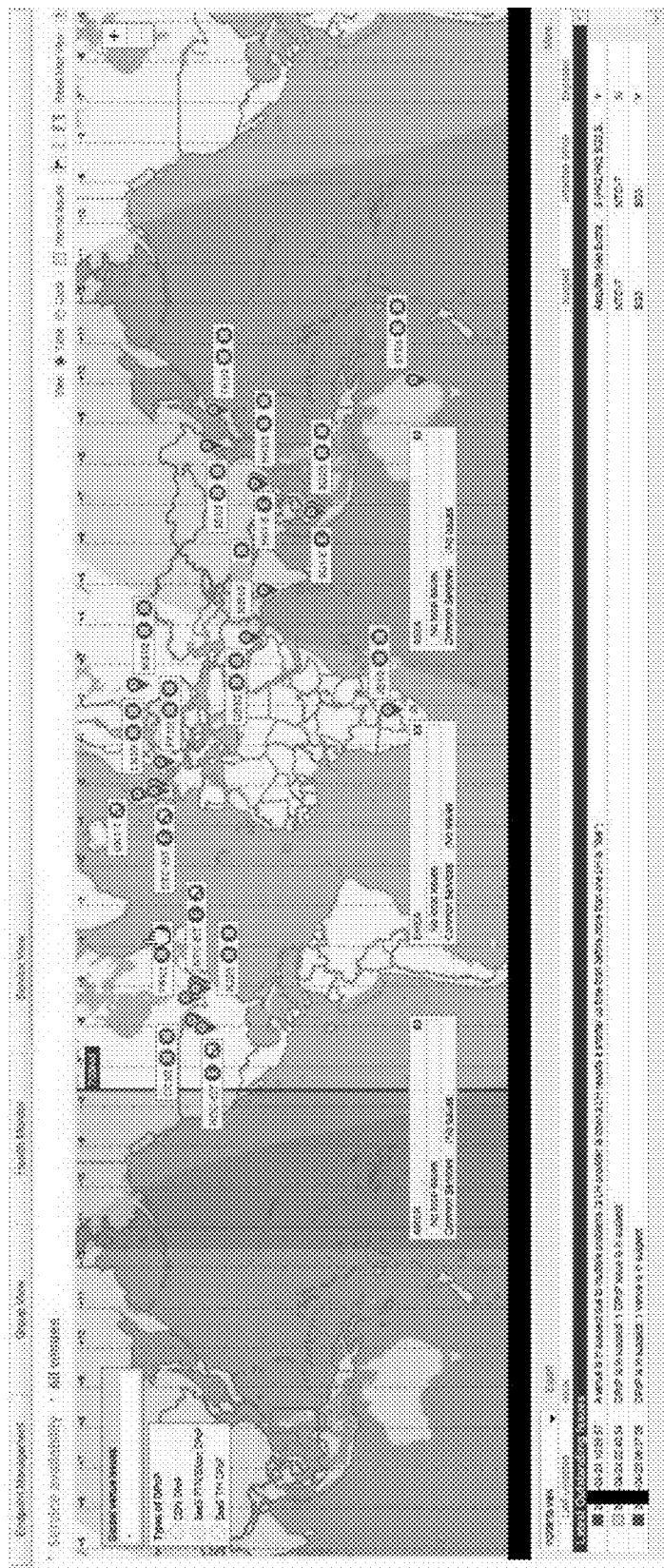
FIG. 17 shows a screen shot diagram in one embodiment of the EP.

FIG. 17 shows a screen shot diagram in one embodiment of the EP. In FIG. 17, another exemplary health status map and an associated health status report are shown. The health status map shows global venues availability. The map shows that there are no issues with data from any of the venues and that there are no issues with regional distribution (common services) in any of the regions (AMER, EMEA, ASIA). Each D-PoP location is represented on the map with a marker and an associated rectangle that shows detailed information regarding the D-PoP location, such as the names and/or types of D-PoPs at the D-PoP location. The health status report shows currently outstanding issues. The health status report shows that some of the venues and D-PoPs are suspected.

Figure 18:
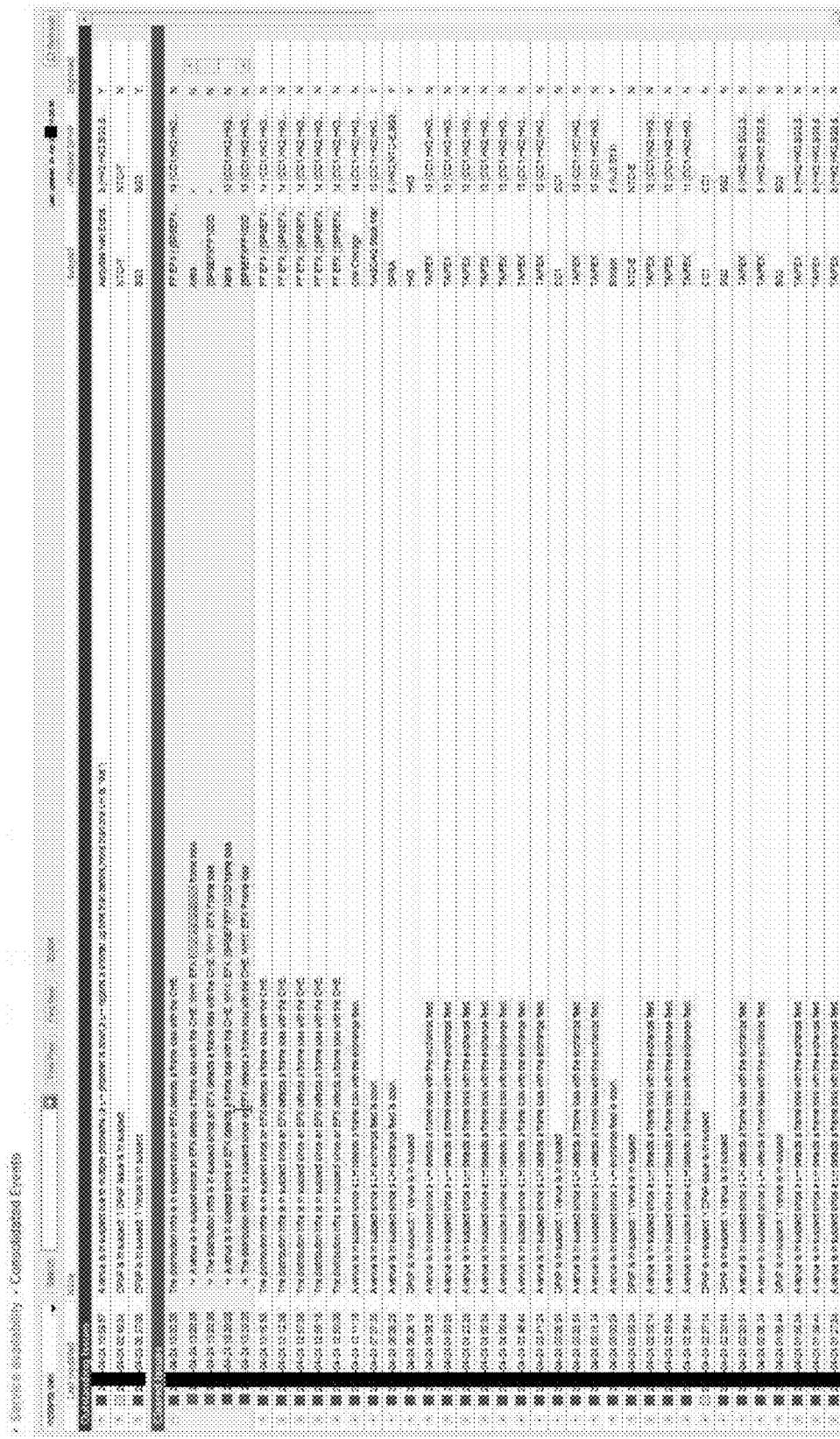
FIG. 18 shows a screen shot diagram in one embodiment of the EP.

FIG. 18 shows a screen shot diagram in one embodiment of the EP. In FIG. 18, another exemplary health status report is shown. The health status report shows currently outstanding issues and cleared issues. As illustrated by the topmost cleared issue entry, additional details regarding an issue may be obtained (e.g., by double clicking on the issue) using the health status report.

Figure 19:
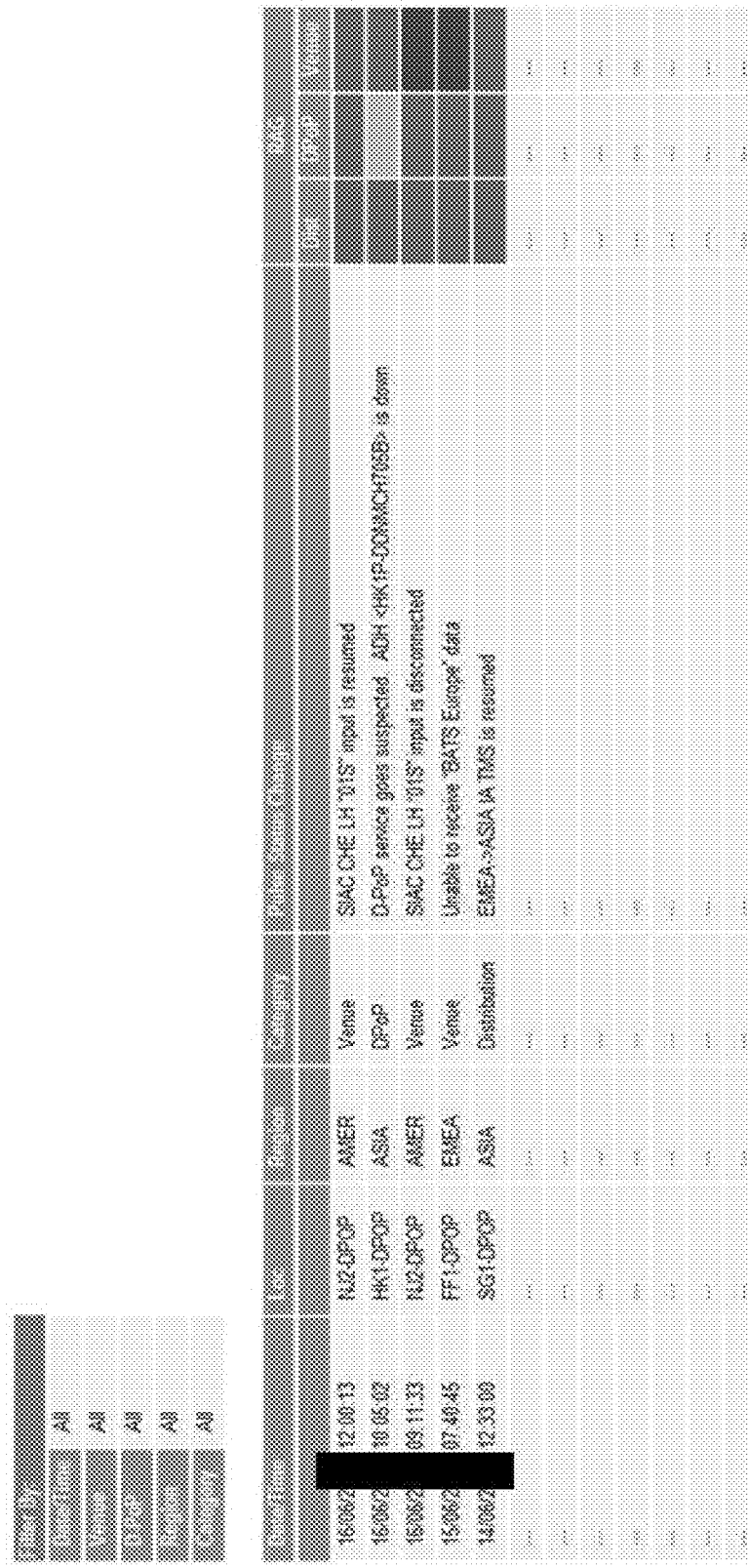
FIG. 19 shows a screen shot diagram in one embodiment of the EP.

FIG. 19 shows a screen shot diagram in one embodiment of the EP. In FIG. 19, another exemplary health status report is shown. The health status report shows informational messages regarding health status problems and resolutions. Differently colored rectangles show whether an informational message is associated with a health problem in regional distribution, D-PoP and/or venue. Different colors represent different problem severities (e.g., healthy may be shown as green, stale may be shown as red, and suspected may be shown as amber). In some implementations, additional details regarding regional distribution, D-PoP and/or venue may be obtained (e.g., by double clicking on the appropriate rectangle). Informational messages may be filtered using one or a combination of date, time, venue, D-PoP, region, category, and/or the like. In some implementations, informational messages may be exported (e.g., in CSV file format).

Detailed Description of the EP Coordinator

Figure 20:
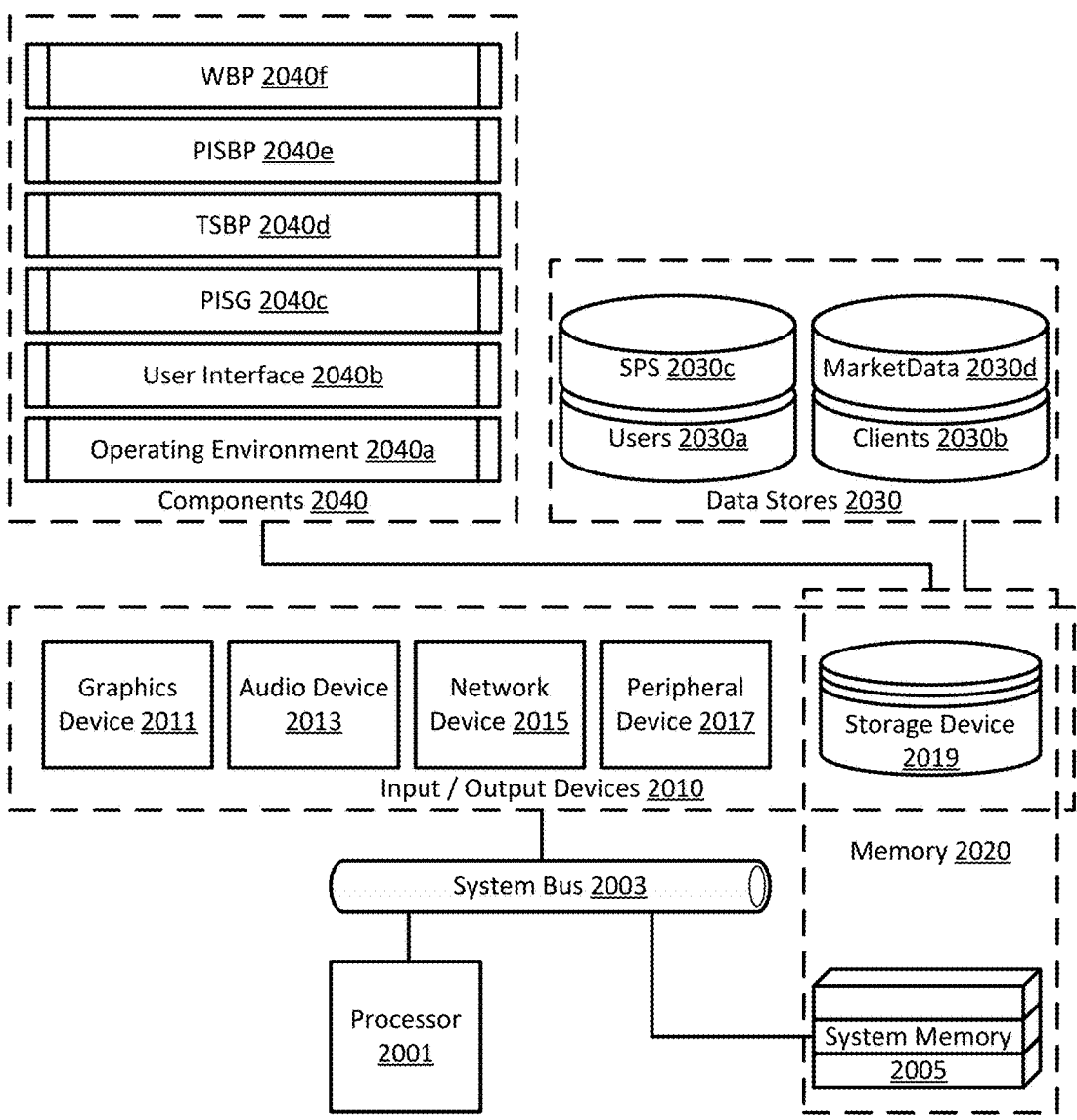
FIG. 20 shows a block diagram illustrating an exemplary EP coordinator in one embodiment of the EP.

FIG. 20 shows a block diagram illustrating an exemplary EP coordinator in one embodiment of the EP. The EP coordinator facilitates the operation of the EP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the EP coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the EP coordinator may comprise a standalone computer system, a distributed computer system, a node in a computer network (i.e., a network of computer systems organized in a topology), a network of EP coordinators, and/or the like. It is to be understood that the EP coordinator and/or the various EP coordinator elements (e.g., processor, system bus, memory, input/output devices) may be organized in any number of ways (i.e., using any number and configuration of computer systems, computer networks, nodes, EP coordinator elements, and/or the like) to facilitate EP operation. Furthermore, it is to be understood that the various EP coordinator computer systems, EP coordinator computer networks, EP coordinator nodes, EP coordinator elements, and/or the like may communicate among each other in any number of ways to facilitate EP operation. As used in this disclosure, the term "user" refers generally to people and/or computer systems that interact with the EP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The EP coordinator includes a processor 2001 that executes program instructions (e.g., EP program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 2005 via a system bus 2003. The system bus may interconnect these and/or other elements of the EP coordinator via electrical, electronic, optical, wireless, and/or the like communication links (e.g., the system bus may be integrated into a motherboard that interconnects EP coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., EP program instructions) executed by the processor. The system memory may facilitate accessing, storing, retrieving, modifying, deleting, and/or the like data (e.g., EP data) by the processor.

In various embodiments, input/output devices 2010 may be connected to the processor and/or to the system memory, and/or to one another via the system bus.

In some embodiments, the input/output devices may include one or more graphics devices 2011. The processor may make use of the one or more graphic devices in accordance with program instructions (e.g., EP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., EP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 2013. The processor may make use of the one or more audio devices in accordance with program instructions (e.g., EP program instructions) executed by the processor. In one implementation, an audio device may be a sound card that may obtain (e.g., via a connected microphone), process, output (e.g., via connected speakers), and/or the like audio data (e.g., EP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 2015. The processor may make use of the one or more network devices in accordance with program instructions (e.g., EP program instructions) executed by the processor. In one implementation, a network device may be a network card that may obtain (e.g., via a Category 5 Ethernet cable), process, output (e.g., via a wireless antenna), and/or the like network data (e.g., EP data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 2017. The processor may make use of the one or more peripheral devices in accordance with program instructions (e.g., EP program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the EP coordinator with a variety of input, output and processing capabilities.

In some embodiments, the input/output devices may include one or more storage devices 2019. The processor may access, read from, write to, store in, erase, modify, and/or the like a storage device in accordance with program instructions (e.g., EP program instructions) executed by the processor. A storage device may facilitate accessing, storing, retrieving, modifying, deleting, and/or the like data (e.g., EP data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 2005 and the one or more storage devices 2019 may be referred to as memory 2020 (i.e., physical memory).

EP memory 2020 contains processor-operable (e.g., accessible) EP data stores 2030. Data stores 2030 comprise data that may be used (e.g., by the EP) via the EP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, EP coordinator elements, and/or the like) to facilitate EP operation. For example, EP data stores may comprise data stores 2030a-d implemented as one or more databases. A users data store 2030a may be a collection of database tables that include fields such as UserID, UserName, UserPreferences, UserVisualizations, UserReports, UserAlarms, and/or the like. A clients data store 2030b may be a collection of database tables that include fields such as ClientID, ClientName, ClientDeviceType, ClientScreenResolution, and/or the like. A SPS data store 2030c may be a collection of database tables that include fields such as SPS_Provider_ID, SPS_Provider_Name, SPS_Provider_Type, SPS_SubProvider_ID, SPS_SubProvider_Name, SPS_SubProvider_Type, SPS_Consumer_ID, SPS_Consumer_Name, SPS_Consumer_Type, SPS_Message_ID, SPS_ProviderData, SPS_SubProviderData, SPS_ConsumerData, SPS_MessageData, InputStatsData, and/or the like. A MarketData data store 2030d may be a collection of database tables that include fields such as VenueID, VenueName, VenueFeeds, FeedData, and/or the like. The EP coordinator may use data stores 2030 to keep track of inputs, parameters, settings, variables, records, outputs, and/or the like.

EP memory 2020 contains processor-operable (e.g., executable) EP components 2040. Components 2040 comprise program components (including program instructions and any associated data stores) that are executed (e.g., by the EP) via the EP coordinator (i.e., via the processor) to transform EP inputs into EP outputs. It is to be understood that the various components and their subcomponents, capabilities, applications, and/or the like may be organized in any number of ways (i.e., using any number and configuration of components, subcomponents, capabilities, applications, EP coordinator elements, and/or the like) to facilitate EP operation. Furthermore, it is to be understood that the various components and their subcomponents, capabilities, applications, and/or the like may communicate among each other in any number of ways to facilitate EP operation. For example, the various components and their subcomponents, capabilities, applications, and/or the like may be combined, integrated, consolidated, split up, distributed, and/or the like in any number of ways to facilitate EP operation. In another example, a single or multiple instances of the various components and their subcomponents, capabilities, applications, and/or the like may be instantiated on each of a single EP coordinator node, across multiple EP coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 2040 may include an operating environment component 2040a. The operating environment component may facilitate operation of the EP via various subcomponents.

In some implementations, the operating environment component may include an operating system subcomponent. The operating system subcomponent may provide an abstraction layer that facilitates the use of, communication among, common services for, interaction with, security of, and/or the like of various EP coordinator elements, components, data stores, and/or the like.

In some embodiments, the operating system subcomponent may facilitate execution of program instructions (e.g., EP program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the EP. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the EP coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the EP coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the EP by providing user interface elements that may be used by the EP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate EP capabilities such as storage, analysis, retrieval, access, modification, deletion, aggregation, generation, and/or the like of data (e.g., the use of data stores 2030). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide the EP with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, EP components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 2030) via the database subcomponent.

In some embodiments, the information handling subcomponent may facilitate presentation of information obtained from users, EP components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate EP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate EP message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates EP security. In some embodiments, the security subcomponent may restrict access to the EP, to one or more services provided by the EP, to data associated with the EP (e.g., stored in data stores 2030), to communication messages associated with the EP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the EP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates EP virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 2040 may include a user interface component 2040b. The user interface component may facilitate user interaction with the EP by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 2040 may include any of the components PISG 2040c, TSBP 2040d, PISBP 2040e, WBP 2040f described in more detail in preceding figures.

The Embodiments of the EP

The entirety of this disclosure (including the written description, figures, claims, abstract, appendices, and/or the like) for ELEKTRON PULSE METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the EP coordinator, EP coordinator elements, EP data stores, EP components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the EP coordinator, EP coordinator elements, EP data stores, EP components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the EP discussed in this disclosure have been directed to monitoring real time market data systems, the innovations described in this disclosure may be readily applied to a wide variety of other fields and/or applications.

The following is claimed:

1. A health status providing apparatus, comprising:
a memory;
a processor in communication with the memory, and configured to issue a plurality of processing instructions stored in the memory, wherein the processor is configured to issue instructions to:
receive by a service provider, over network, a health status subscription request from a service consumer, wherein the service provider is associated with one or more subproviders;
determine by the processor identifying information associated with the one or more subproviders, wherein the identifying information for a subprovider is sufficient to allow the service consumer to send a health status subscription request to the subprovider;
determine a latency associated with each of the one or more subproviders by analyzing a latency statistics field of a service provider status (SPS) message received by the health status providing apparatus from the subprovider, wherein said SPS message includes health status information of the service provider, a subprovider status, a domain, quality of service information, and a frequency of publication;
generate by the processor a health status message of a first type, wherein the health status message includes the determined identifying information and the determined latency;
send, over network, the generated message to the service consumer; and
adjust a delivery path of data content based on the health status message by adjusting at least one network device selected for delivery of the data content in order to switch to a healthy subprovider having latency that is within acceptable bounds;
wherein the service provider or at least one of the one or more subproviders is further configured to send a message of a second type, over network, to one or more subscribers via a data stream including the health status message of the first type.

2. The apparatus of claim 1, wherein the service provider is associated with a plurality of subproviders, and wherein the instructions to determine health status data associated with the service provider include instructions to determine health status data for each respective subprovider among the plurality of subproviders.

3. The apparatus of claim 1, wherein the service provider is a collection head end responsible for ingesting market data content from an associated venue, and wherein a subprovider is a line handler responsible for processing a portion of the market data.

4. The apparatus of claim 1, wherein the service provider is a component of said network, and the instructions to adjust the delivery path of the data content based on the health status message include instructions to prevent trading of a security when the health status message indicates that the service provider or the subprovider is not healthy.

5. The apparatus of claim 1, wherein the service consumer is a trading application, and the instructions to adjust the delivery path of the data content based on the health status message include instructions to adjust selection of inter-area communication infrastructure components for delivering the data content based on the health status message.

6. The apparatus of claim 1, further comprising instructions to determine health status data associated with the service provider, and wherein the health status message further includes the determined health status data.

7. The apparatus of claim 6, wherein the health status data includes information regarding content failure, and further wherein the health status providing apparatus further includes a content failure reporting component that is configured to monitor said content for errors.

8. The apparatus of claim 7, wherein the content failure reporting component is programmed to publish a set of SPS messages regarding detected content errors to said service consumer.

9. The apparatus of claim 7, wherein the content failure reporting component is programmed to monitor said content for data anomalies in price data supplied by a venue or service provider.

10. The apparatus of claim 7, wherein the content failure reporting component is programmed to detect that a price of a security provided in a data feed is outside expected bounds based on a threshold difference in standard deviations between the average price of the security over a specified time period and the provided price value in the data feed.

11. The apparatus of claim 1, wherein instructions to send the generated message further comprise instructions to multicast the generated message to a plurality of subscribed service consumers including the service consumer.

12. The apparatus of claim 1, wherein the message of a second type is a market data message.

13. The apparatus of claim 1, wherein the message of a second type includes pricing data or volume data for a security.

14. The apparatus of claim 1, wherein said SPS message further includes a timestamp, a failure indicator, and an input feed status.

15. A health status consuming apparatus, comprising:
a memory;
a processor in communication with the memory, and configured to issue a plurality of processing instructions stored in the memory, wherein the processor is configured to issue instructions to:
receive by a service consumer, over network, a market data message associated with a security;
parse by the processor the market data message to determine health status reference data identifying a service provider or a subprovider of the service provider, wherein the processor parses a latency statistics field of said market data message;
generate by the processor a health status subscription request using the determined health status reference data;
receive by the service consumer, over network, a health status message via a data stream including market content data, in response to the health status subscription request;
determine by the processor health status information associated with the service provider or the subprovider by analyzing the health status message, wherein the processor determines a latency associated with the service provider or the subprovider from said latency statistics field of said market data message, the market data message further including health status information of the service provider or subprovider, a service provider or subprovider status, a domain, quality of service information, and a frequency of publication; and
identify a delivery path to provide market data associated with the security, the delivery path including selection of service providers or subproviders and at least two of infrastructure components, network components, and inter-area communication infrastructure components for providing the market data, where the delivery path is selected at least in part based on the determined health status information.

16. The apparatus of claim 15, further comprising instructions to:
receive by the service consumer, over network, a subsequent health status message in response to the health status subscription request;
determine by the processor updated health status information associated with the service provider or the subprovider by analyzing the subsequent health status message; and
utilize the determined updated health status information in a selected application.

17. The apparatus of claim 15, wherein the health status message identifies whether the service provider or the subprovider is healthy, unhealthy, or suspect.

18. The apparatus of claim 15, wherein the service consumer differentiates between market data messages and health status messages based on a message type data field that identifies the type of a message.

19. The apparatus of claim 15, further including instructions to generate a map showing health status of monitored components including the service provider or the subprovider.

20. The apparatus of claim 15, further including instructions to generate a report showing health status of monitored components including the service provider or the subprovider.

21. The apparatus of claim 15, further including instructions to generate an alert when the health status information indicates that the service provider or the subprovider is not healthy.

22. The apparatus of claim 15, further including instructions to prevent trading of the security when the health status information indicates that the service provider or the subprovider is not healthy.

23. The apparatus of claim 15, further including instructions to switch to a backup provider of market data associated with the security when the health status information indicates that the service provider or the subprovider has a latency outside of acceptable bounds.

24. The apparatus of claim 15, further including instructions to switch to using a different provider or a different subprovider when the health status information indicates that the latency associated with the service provider or the subprovider is higher than a predetermined threshold.

25. The apparatus of claim 15, further including instructions to adjust the delivery path of the market data based on the determined health status information.

26. The apparatus of claim 15, further including instructions to predict future network failures based on the determined health status information, and generate a report showing the predicted network failures.

* * * * *